(12) United States Patent
Matsumoto et al.

(10) Patent No.: US 6,582,207 B2
(45) Date of Patent: Jun. 24, 2003

(54) MOTOR COMPRESSOR AND COOLING APPARATUS USING THE SAME

(75) Inventors: Kenzo Matsumoto, Ora-gun (JP); Manabu Takenaka, Ora-gun (JP); Tsuyoshi Higuchi, Ota (JP); Kazuaki Fujiwara, Ota (JP); Keijiro Igarashi, Ota (JP); Masaaki Takezawa, Nitta-gun (JP); Kazuhiko Arai, Nitta-gun (JP)

(73) Assignee: Sanyo Electric Co., LTD, Osaka (JP)

( * ) Notice: Subject to any disclaimer, the term of this patent is extended or adjusted under 35 U.S.C. 154(b) by 0 days.

(21) Appl. No.: 09/863,868

(22) Filed: May 24, 2001

(65) Prior Publication Data
US 2002/0051715 A1 May 2, 2002

(30) Foreign Application Priority Data
May 31, 2000 (JP) .................................... 2000-162696

(51) Int. Cl.[7] ........................... F04B 17/00; F04B 35/04
(52) U.S. Cl. .............................. 417/410.1; 417/423.7; 417/902; 310/156.53; 310/254; 310/216
(58) Field of Search ................ 310/156.53, 156.56, 310/254, 259, 216, 217; 417/410.1, 410.3, 902, 423.7

(56) References Cited

U.S. PATENT DOCUMENTS

| | | | | |
|---|---|---|---|---|
| 5,006,051 A | * | 4/1991 | Hattori | 418/60 |
| 5,666,015 A | * | 9/1997 | Uchibori et al. | 310/261 |
| 6,049,153 A | * | 4/2000 | Nishiyama et al. | 310/156 |
| 6,089,834 A | * | 7/2000 | Ozu et al. | 417/410.1 |
| 6,218,753 B1 | * | 4/2001 | Asano et al. | 310/156 |

FOREIGN PATENT DOCUMENTS

JP 7-236239 * 9/1995

* cited by examiner

Primary Examiner—Charles G. Freay
Assistant Examiner—Han L. Liu
(74) Attorney, Agent, or Firm—Armstrong, Westerman and Hattori, LLP

(57) ABSTRACT

An objective of the present invention is to provide a motor compressor that reduces noise by lessening a contact area between a stator and a shell, wherein a motor element is constituted of a stator having a stator core that contacts and is fixed to an internal wall of the closed vessel, and a rotator having a magnetic substance, which is attached to the rotating shaft and is rotatably supported in the inside of the stator construct. It is essential that H<Ho is satisfied wherein H is a dimension in a rotating shaft direction of an area in which the stator core contacts the closed vessel and Ho is a dimension in a rotating shaft direction of the stator core.

7 Claims, 21 Drawing Sheets

MOTOR COMPRESSOR AND COOLING APPARATUS USING THE SAME

BACKGROUND OF THE INVENTION (i) Field of the Invention

The present invention relates to a motor compressor comprising a motor element and a compression element which is driven by a rotating shaft connected to the motor element in a closed vessel.

(ii) Description of the Related Art

Heretofore, this kind of motor compressor has been disclosed in Japanese Patent Application Laid-Open Nos. 288180/1998 (FO4C29/00) and 350444/1993 previously filed by the present applicant. An induction motor, a DC motor, and so forth are used as the motor of the conventional motor compressor, but the DC motor is designed so that a laminated thickness of a permanent magnet and a rotor is the same as that of a stator in case that it is a rare earth permanent magnet motor, and the laminated thickness of the rotator and the permanent magnet is higher than that of the stator in case that it is a ferrite permanent motor.

Next, this conventional type of the motor 100 will be explained by use of FIG. 21 and FIG. 22. A closed vessel 101 in the drawings contains a motor 102 (e.g., a DC motor) as the motor element in the internal upper side thereof, and a compression element 103 being rotatably driven by this motor 102 in the lower side. The closed vessel 101, which comprises a cylindrical shell 101A with the upper end thereof opened, and an end cap 101B that clogs the upper end opening of the shell 101A, is a two-section configuration and is configured by capping the cylindrical shell 101A with the end cap 101B to close it with a high frequency deposition, and so forth, after inserting the motor 102 and the compression element 103 within the shell 101A. Furthermore, the bottom within the shell 101A of the closed vessel 101 becomes an oil sump SO.

The motor 102 is constituted of a stator 104 fixed to the internal wall of the closed vessel 101 and a rotator 105 with a rotating shaft 106 centered rotatably supported in the inside of this stator 104. The stator 104 is constituted of a stator core 174 configured by laminating a plurality of steel sheets for stator sheets with substantially a donut shape, and a stator winding (drive coil) 107 for applying rotating magnet field to the rotator 105, which is mounted with a distributed winding technique on a plurality of teeth formed in an internal periphery of this stator core 174. Moreover, the peripheral surface of this status core 174 contacts and is fixed to the internal wall of the shell 101A of the closed vessel 101.

In this case, a plurality of notches 176 are formed in the peripheral surface of the stator core 174, and these notches 176 are spaced from the internal wall of the shell 101A, wherein a path 177 is configured.

The compression element 103 comprises a first cylinder for a rotary 109 and a second cylinders for a rotary 110 separated by an intermediate parting stop 108. To each of the cylinder 109 and 110 are attached eccentrics 111 and 112 being rotatably driven by the rotating shaft 106, and each eccentricity of the eccentrics 111 and 112 is 180° degree out of phase from the other.

113 and 114 indicate a first roller and a second roller that rotate within the cylinder 109 and 110, respectively, and each rotates within the cylinders by the rotation of the eccentrics 111 and 112, respectively. 115 and 116 indicate a first frame and a second frame. The first frame 115 causes compressed air to be formed between the parting stop 108 and the frame with the cylinder 109 closed, and the second frame 116 also causes compressed air to be formed between the parting stop 108 and the frame with the cylinder 110 closed. Furthermore, the first frame 115 and the second frame 116 comprise bearings 117 and 118, respectively, that rotatably and axially support the lower portion of the rotating shaft 106.

119 and 120 indicate cap mufflers which are attached so as to cover the first frame 115 and the second frame 116. In addition, the cylinder 109 and the cap muffler 119 are in mutual communication by a communicating hole (not shown) provided in the first frame 115, and the cylinder 110 and the cap muffler 120 are also in mutual communication by a communicating hole (not shown) provided in the second frame 116, 121, which is a bypass pipe provided outside the closed vessel 101, is in communication with the internal side of the cap muffler 120.

122 is a vent pipe provided on the top of the closed vessel 101, and 123 and 124 are suction pipes that connect to the cylinder 109 and 110 respectively. Furthermore, 125, which is a closed terminal, is for supplying a power from the external side of the closed vessel 101 to the stator winding 107 (a lead wire that connects the closed terminal 125 and the stator winding 107 is not shown in the figure).

A rotator core 126 of the rotator 105 has a plurality of steel sheets for a rotator with a predetermined shape stamped from magnetic steel sheets with thickness 0.003 mm to 0.007 mm to be laminated to caulk each other for integration.

In this case, the steel sheets for a rotator of the rotator core 126 are stamped from magnetic steel sheets so that salient poles 128, 129, 130 and 131 are formed that construct a quadrupole, and 132, 133, 134 and 135 are concavities provided so that the salient poles are formed between each of the salient poles 128, 129, 130 and 131, and the other respectively.

Slots 141, 142, 143 and 144 for inserting a magnetic substance 145 (permanent magnet) correspond to each of the salient poles 128, 129, 130 and 131, respectively, and they are concentrically slotted on the periphery side of the rotator core 126 along the direction of an axis of the rotating shaft 106.

Furthermore, a hole 146, into which the rotating shaft 106 is shrink-fitted, is formed at the center of the rotator core 126. Each rotator core 126 is formed by caulking each other for integration after laminating a plurality of steel sheets for a rotator.

The magnetic substance 145 set forth above is constituted of a rare earth magnetic material such as a praseodymium magnet material or a neodymium magnetic material whose surface is plated with nickel or the like, and the external shape thereof is to be a profile rectangle, and, as a whole, to be rectangular. Each of the slots 141, 142, 143 and 144 is to be sized so that this magnetic substance 145 is inserted. Moreover, 166 and 167, which are flat-shape end members being attached to the upper and the lower end of the rotator core 126, are formed of non-magnetic materials such as stainless steel, brass or the like in a nearly discus shape.

In addition, 172, which is located above the end member 166, is a discus-shape plate for separating oil attached to the rotator 105, and 173 is a balancing weight attached between the plate 172 and the end surface 166.

In such a configuration, when a power is applied to the stator winding 107 of the stator 104 of the motor 102, a rotating magnetic filed is formed to rotate the rotator 105. Rollers 113, and 114 within the cylinder 109 and 110 are eccentrically rotated via the rotating shaft 106 by this rotation of the rotator 105, and suction gas sucked from the suction 123 and 124 is compressed.

The compressed high-pressure gas is vented within the cap muffler 119 and from the cylinder 109 via the communicating hole, and is vented within the closed vessel 101 from the vent hole (not shown) formed in this cup muffler 119. On the other hand, from the cylinder 110, the compressed high-pressure gas is vented into the cup muffler 120 via the communicating hole, and is vented into the closed vessel 101 through the bypass pipe 121.

The vented high-pressure gas passes through a gap within the motor 102 to reach the vent pipe 122, and is vented to the external side. On the other hand, oil is contained in the gas, but this oil, which is separated by the plate 172, and the like, until it reaches the vent pipe 122, is directed externally by a centrifugal force, and flows down to the oil gathering SO through the path 177.

Such a motor 102 provided in the motor compressor 100 has been designed so that, in case that the magnetic substance 145 is a rare earth permanent magnet, a thickness dimension of a permanent magnet and the rotator 105, and a laminated thickness of the stator 104 are almost the same, and in case that the magnetic substance 145 is a ferrite permanent magnet, the laminated thickness of the permanent magnet and the rotator 105 is higher than that of the stator 104.

However, in the DC motor (electric motor) for use in the compressor, a radial magnetic attraction/repulsion force of the stator is big, as compared with a normal reduction motor. For this reason, a yoke of the motor is shaken, which has been a factor to the increase in noise of the motor compressor. In particular, in the motor using a rare earth permanent magnet with a high magnetic force and in a magnetic-pole concentrated winding motor having less number of slots, variation in magnetic flux is bigger than that of a motor having many slots and, accordingly, the problem existed that the noise reduction is a big task.

In addition, the vibration shaken at the teeth of the stator core shook the yoke of the stator to directly vibrate the shell at the contact area to the shell. The problem existed that this is also a factor to the increase in noise of the motor compressor.

SUMMARY OF THE INVENTION

The present invention has been accomplished to solve such conventional tasks, and an objective of the present invention is to provide a motor compressor that can drastically reduce noise by lessening a contact area between a stator and a shell.

Namely, a first aspect of the present invention is directed to a motor compressor comprising a motor element and a compression element which is driven by a rotating shaft connected to the motor element in a closed vessel, wherein the motor element is constituted of a stator having a stator core that contacts and is fixed to the inside wall of the closed vessel, and a rotator having a magnetic substance which is attached to a rotating shaft and rotatably supported in the inside of the stator; and H<Ho is satisfied wherein H is a dimension in a rotating shaft direction of an area in which the stator core contacts the closed vessel, and Ho is a dimension in the rotating shaft direction of the above stator core.

Furthermore, a second aspect of the present invention is directed to a motor compressor comprising a motor element and a compression element which is driven by a rotating shaft connected to the motor element in a closed vessel, wherein the motor element is constituted of a stator having a stator core that contacts and is fixed to the inside wall of the closed vessel, and a rotator having a magnetic substance which is attached to a rotating shaft and rotatably supported in the inside of the stator; and Hmg<Ho is satisfied wherein Hmg is a dimension of the magnetic substance in the direction of the rotating shaft and Ho is a dimension of the above stator core in the direction of the rotating shaft.

In addition, a third aspect of the present invention is directed to a motor compressor comprising a motor element and a compression element which is driven by a rotating shaft connected to the motor element in a closed vessel, wherein the motor element is constituted of a stator having a stator core that contacts and is fixed to the inside wall of the closed vessel, and a rotator having a magnetic substance which is attached to the rotating shaft and rotatably supported in the inside of the stator; and H<Ho and Hmg<Ho are satisfied wherein H is a dimension in a rotating shaft direction of an area in which the stator core contacts the closed vessel, Ho is a dimension in the rotating shaft direction of the above stator core, and Hmg is a dimension of the magnetic substance in the direction of the rotating shaft.

Furthermore, in addition to the first to third inventions, the motor compressor of the present invention is configured to set a ratio of a dimension H to a dimension Ho at $0.2 \leq H/Ho \leq 0.8$.

In addition, in addition to the second and third inventions, the motor compressor of the present invention is configures to set a ratio of dimension Hmg to a dimension Ho at $0.2 \leq H/Ho \leq 0.98$.

Furthermore, in addition to the above-mentioned inventions, in the motor compressor of the present invention, the magnetic substance is constituted of the rare earth magnetic material; and a ratio of L to D, L/D<1.1 is satisfied wherein L is a dimension of the above rotator core in the direction of the rotating shaft and D is a diameter of the rotator core of the rotator; and a ratio of t to the dimension Hmg, t/Hmg<0.1 is satisfied wherein t is a thickness dimension of the magnetic substance.

Additionally, the present invention is directed to a cooling apparatus in which a refrigerant circuit is constituted of the motor compressor of the above-mentioned invention, a condenser, a pressure reducing apparatus and an evaporator.

DETAILED DESCRIPTION OF THE PREFERRED EMBODIMENT

Figure 1:
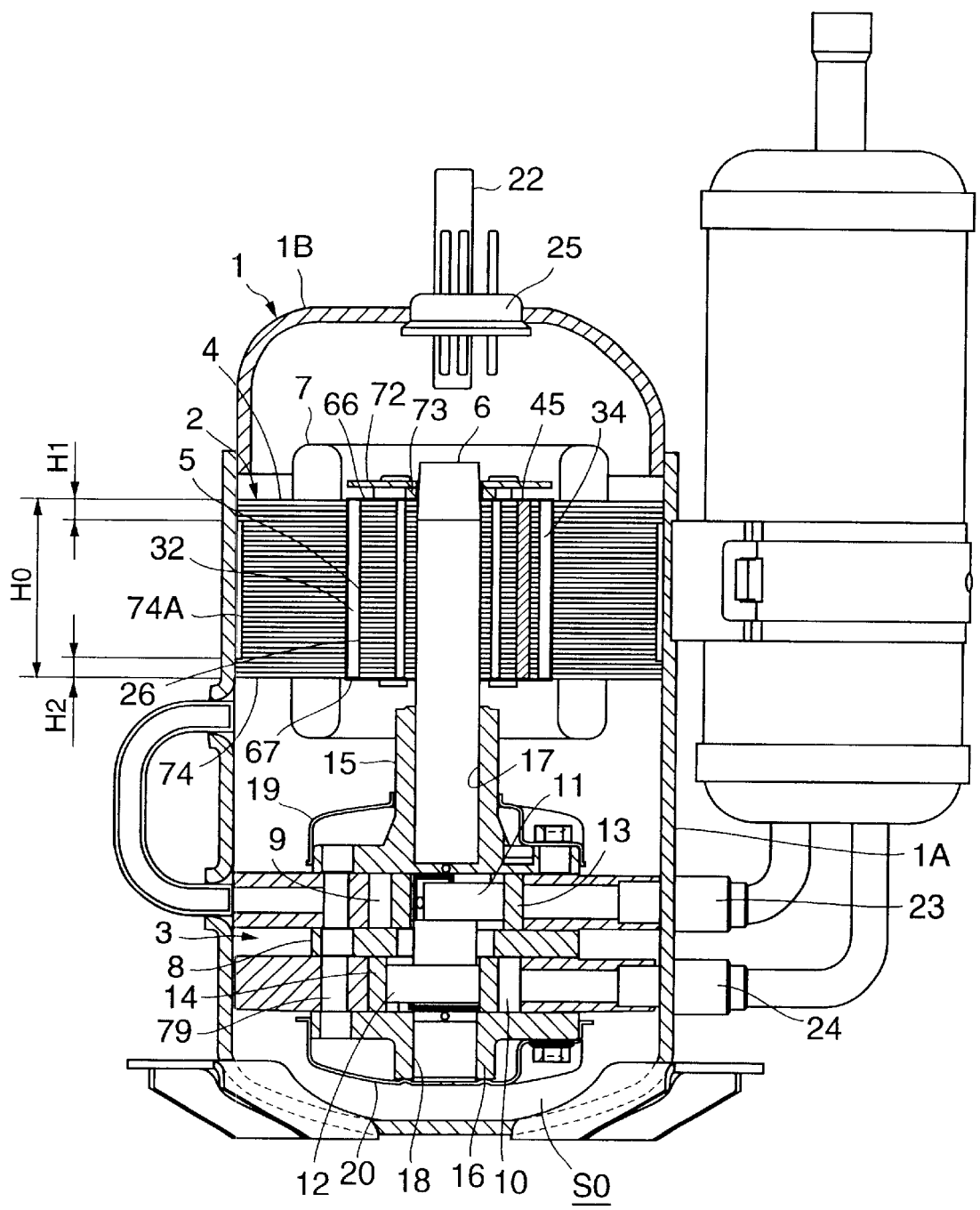
FIG. 1 is a longitudinally sectional side view of a motor compressor of the present invention with notches provided in a rotator in the circumferential direction of a rotating shaft.
Figure 2:
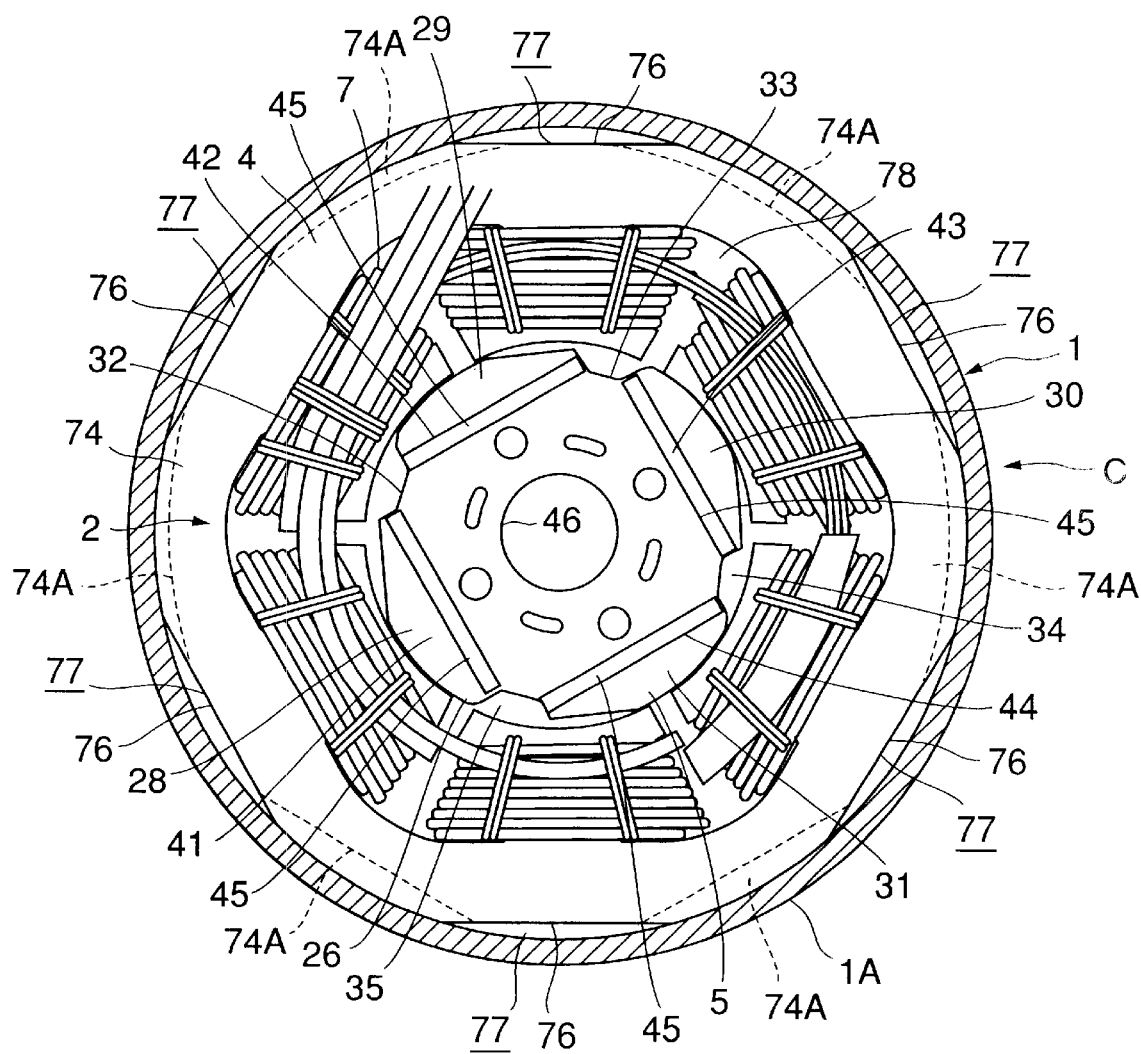
FIG. 2 is a cross sectional top view of the motor compressor of the same FIG. 1

Next, an embodiment of the present invention will be explained based on the drawings. In FIG. 1 and FIG. 2, a closed vessel 1, that constructs a cooling apparatus provided in a freezing warehouse, a refrigerator, a showcase or the like, has a motor 2 as a motor element in the internal upper side thereof, and a compression element 3 being rotatably driven by this motor 2 in the upper side thereof to be contained. The closed vessel 1, which comprises a cylindrical shell 1A with the upper end thereof opened and an end cap 1B that clogs the upper end opening of this shell 1A, is a two-section configuration, and is configured by capping the cylindrical shell 1A with the end cap 1B to close with a high frequency deposition and so forth after containing the motor 2 and the compression element 3 within the shell 1A. Moreover, the bottom within the shell 1A in this closed vessel 1 becomes an oil gathering SO.

The motor 2, which is a DC brush-less series motor with what is called a magnetic-pole concentrated winding technique, is constituted of a stator 4 that is fixed to the internal wall of the closed vessel 1, and a rotator 5 with the rotating shaft 6 centered rotatably supported in the inside of this stator 4. Moreover, the stator 4 is constituted of a stator core 74 configured by laminating a plurality of donut-shape stator steel sheets (silicon steel sheet), and a stator winding (drive coil) 7 for applying rotating magnet field to the rotator 5.

In the internal periphery of the stator core 74 are provided six (6) teeth (not shown), and slots 78 which are opened internally, and above and below, are formed among these teeth. In addition, by winding in series the stator winding 7 on these teeth, using space of the slots 78, to form magnetic poles of the stator 4 with what is called a magnetic-pole concentrated winding technique, the stator 4 having four (4) poles and six (6) slots is configured.

The periphery surface of such a stator core 74 contacts and is fixed to the internal wall of the shall 1A of the closed vessel 1. In this case, when a dimension of the area in the axial direction of the rotating shaft 6 in which the stator core 74 contacts the closed vessel 1 is H, and a dimension of the above stator core 74 in the axial direction the rotating shaft 6 is Ho, H<Ho is configured. Furthermore, in the peripheral surface of the stator core 74 are formed a plurality of notches 76 (in an example, six (6)) with the circumference thereof notched in a chord shape, and these notches 76 are spaced from the internal wall of the shell 1A, wherein a path 77 for oil return is configured, as will be described later.

Figure 3:
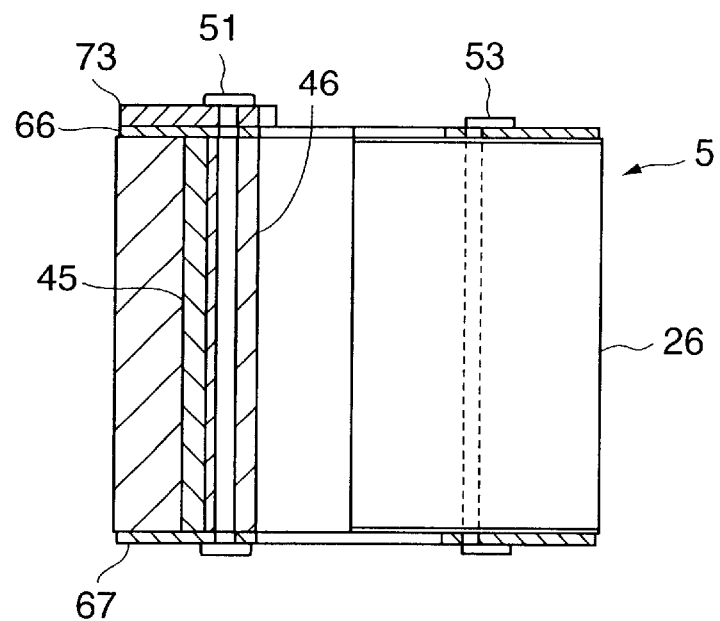
FIG. 3 is a longitudinally partial sectional side view of a rotator of the present invention.
Figure 4:
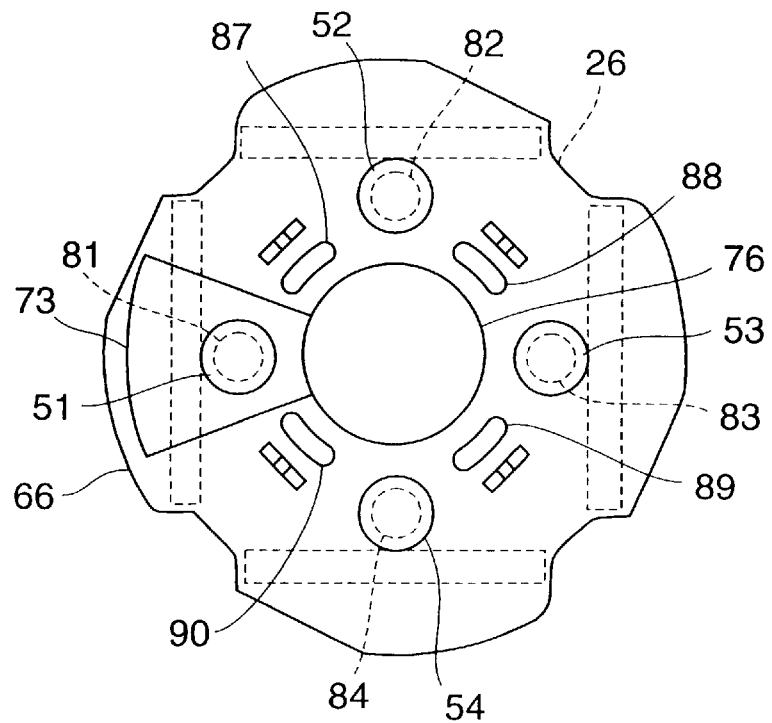
FIG. 4 is a plan view of a rotator of the present invention.

FIG. 3 is a longitudinal partial section side view of the rotor 5 shown in FIG. 1 and FIG. 4 is a plan view (in a situation before being inserted into the rotating shaft 6). In each drawing, a rotator core 26 has a plurality of steel sheets for a rotator 27 with such a shape shown in FIG. 5 stamped from a magnetic steel sheet with 0.3 to 0.7 mm of thickness to be laminated to caulk each other for integration (In addition, integration by welding instead of caulking is also acceptable.).

Figure 5:
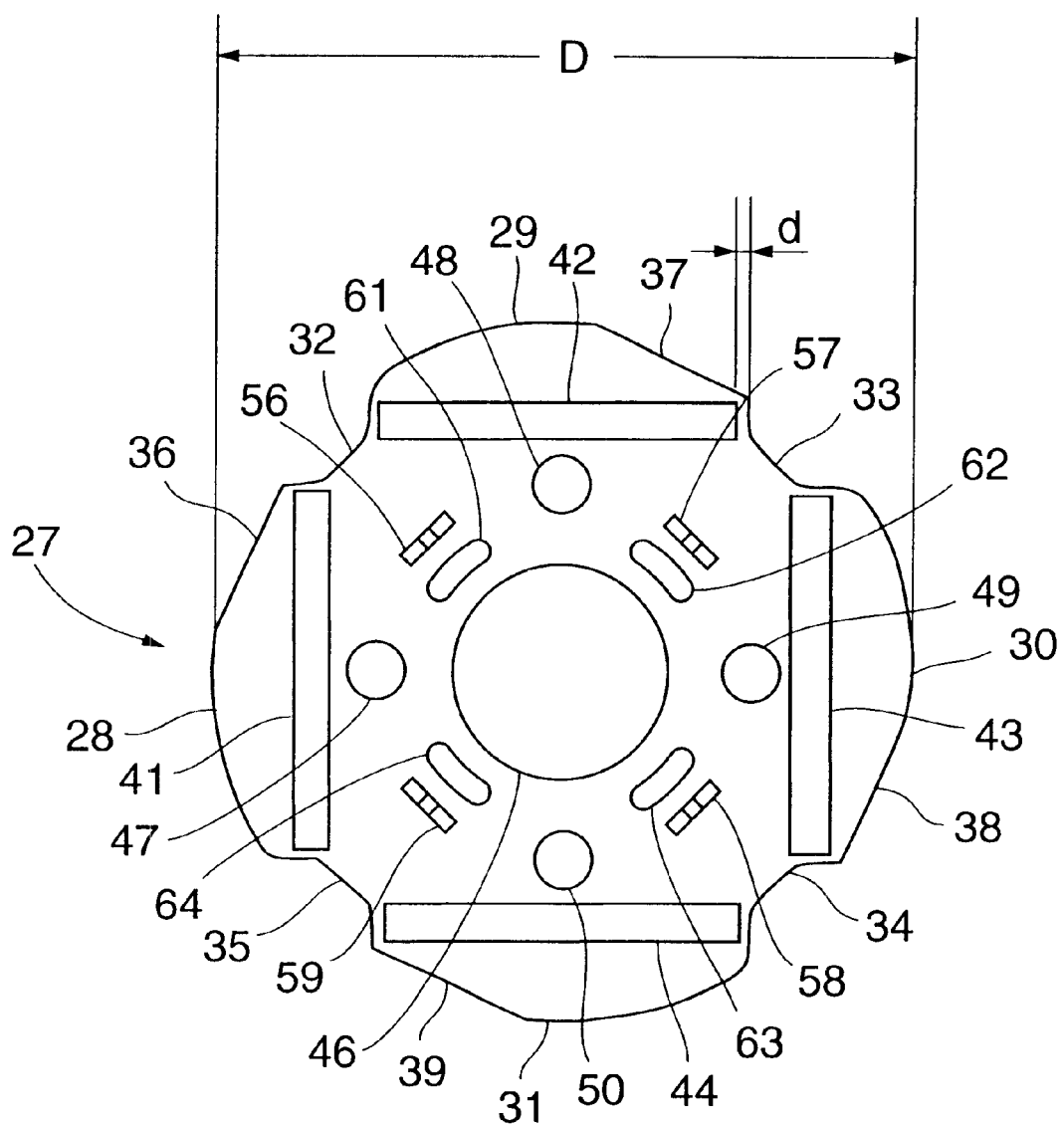
FIG. 5 is a plan view of a steel sheet for a rotator that constructs a rotator of the present invention.

This steel sheet for a rotator 27 is stamped from the magnetic steel sheet so that salient poles 28 to 31 are formed that constructs such a quadrupole magnetic pole shown in FIG. 5, and 32 to 35 are concavities provided so tat the salient poles are formed between each of the salient poles 28 to 31 and the other respectively. An outside diameter (diameter) D of apexes of the above salient poles 28 to 31 is, for example, 50 mm in the example of a compressor of a 15 frame. Furthermore, a predetermined range is obliquely and inwardly cut out from the outside surface of each of the salient poles 28 to 31 in a clockwise direction (a rotating direction of the rotator 5 in the example, a clockwise direction in FIG. 5) to form cut portions 36 to 39. In addition, when the rotator 5 is designed so as to rotate in counterclockwise direction, the opposite side to the clockwise direction are cut out to configure the cut portions 36 to 39. Namely, the opposite side to FIG. 4 and FIG. 5 is cut out.

41 to 44, which are slots for press-fitting a magnetic substance 45 (permanent magnet) to be described later, correspond to each of salient poles 28 to 31, and are concentrically slotted in the periphery of the steel sheet for a rotator 27 along the axial direction of the rotating shaft 6. Moreover, a width d of a narrow path between each of slots 41 to 44 and a neighboring salient pole of the salient pole 28 to 31 is to be set at 0.3 mm to 1.0 mm (in the example, 0.5 mm).

Furthermore, 46, which is formed in the center of the steel sheet for a rotator 27, is a hole into which the rotating shaft 6 is shrink-fitted. Moreover, the rotator core 26 is formed by caulking each other for integration after laminating a plurality of steel sheets for a rotator 27. 47 to 50 are penetrated holes of which the shape is almost the same as that of holes into which rivets 51 to 54 for caulking to be described later are inserted, are correspondingly slotted inside each of the slots 41 to 44. 56 to 59, which are caulking portions for fastening each of steel sheets for a rotor 27 to the other, are formed between each of slots 41 to 44 and the other in the near concentricity with the penetrated holes 47 to 50. Furthermore, 61 to 64 are holes for forming an oil passage slotted inside the caulking portions 56 to 59.

Figure 6:
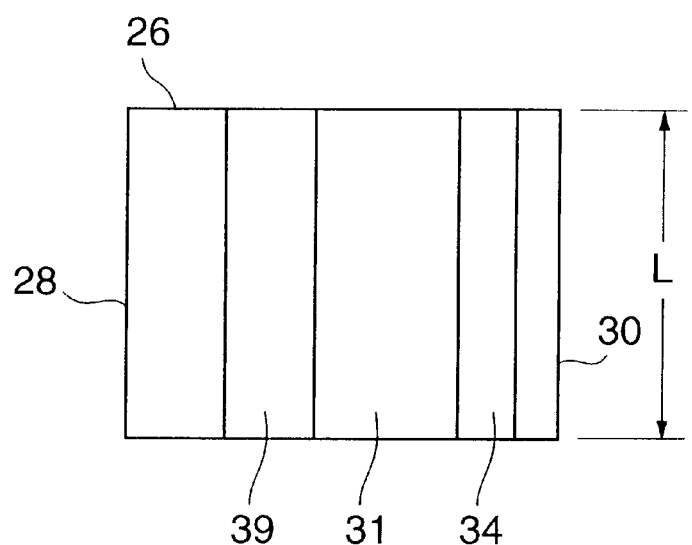
FIG. 6 is a side view of a rotator core that constructs a rotator of the present invention.

By laminating a plurality of the steel sheets for a rotor 27 to caulk each other in the caulking portions 56 to 59 for integration, such rotator core 26' such as shown in the side view of FIG. 6, is formed. At this moment, the diameter of the rotator core 26 is the diameter D (50 mm) of tho foregoing steel sheet for a rotor 27, and the laminated dimension L in the axial direction of the rotating shaft 6 is set to be, for example, 40 mm. Herein, a ratio of the diameter D and the dimension L, L/D, is configured to be smaller than 1.1 and, in the example, is 0.8. Namely, the dimension L in the axial direction of the rotating shaft 6 is set to be smaller.

Figure 7:
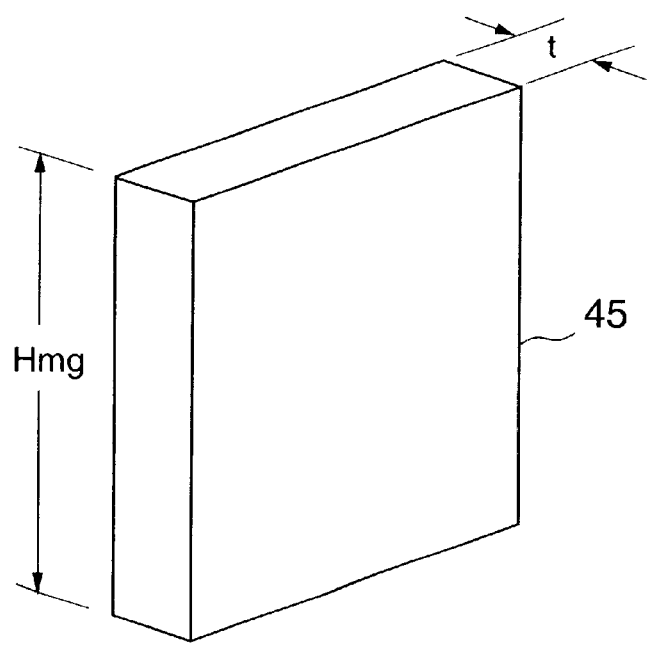
FIG. 7 is an oblique view of a magnetic substance that constructs a rotator of the present invention.

On the other hand, a magnetic substance 45 is constituted of, for example, a rare earth magnetic material, such as praseodymium magnetic material, a neodymium magnetic material with the surface thereof nickel-plated, or the like, of which the external shape is to be rectangular, such as shown in FIG. 7. In addition, each of the slots 41 to 44 is to he sized so that this magnetic substance 45 is neatly press-fitted. The thickness t of the above magnetic substance 45 is sized to be, for example, 2.65 mm, and the dimension thereof in the axial direction of the rotating shaft 6 Ring is sized to be 40 mm, which is the same as the foregoing dimension L. In addition, a ratio of the thickness t and the dimension Hmg, t/Hmg, is configured to be smaller than 0.1 (in the example, 0.08). Namely, in case that the dimension Hmg of the magnetic substance 45 in the direction of the rotating shaft 6 is Hmg, and the dimension of the stator core 74 in the axial direction of the rotating shaft 6 is Ho, Hmg<Ho is configured. Moreover, 72 is a discus-shaped plate for separating oil attached to the rotator 5, which is positioned above an end member 66, and 73 is a balancing weight attached between the plate 72 and the end member 66.

66 and 67, which are flat-plate end members being attached to the upper end lower ends of the rotator core 26, are formed of nonmagnetic materials such as aluminum, a resin material, and so forth, in almost the same shape as that of the steel sheet for a rotor 27. In addition, the diameter of these end members 66 and 67 are to be almost the same as, or a little smaller than, the outer diameter D of the rotator core 26. Moreover, penetrated holes 81 to 84 are slotted at the positions that correspond to the penetrated holes 47 to 50 in end members 66 and 67. At the positions that correspond to the holes 59 and 61 to 64 are slotted holes 76 and 87 to 90.

Furthermore, after press-fitting the magnetic substance 45 into the slots 41 to 44 of the rotator core 26, the upper and lower end members 66 and 67 are set to clog the upper and lower end of slots 41 to 44. In this situation, the penetrated holes 47 to 50 and 81 to 84 penetrate the rotator core 26 and the end members 66 and 67 along the direction of the rotating shaft 6. Moreover, the holes 61 to 64 and 87 to 90 penetrate the rotator core 26 and the end members 66 and 67. Thereafter, the rivets 51 to 54 are sequentially inserted into each of the penetrated holes 47 to 50 and 81 to 84 to caulk the upper and lower ends thereof for an integrated configuration. In addition, 73 is a balancing weight, which is fixed to the rotator core 26 together with the upper end member 66 by the rivet 51.

In the stator core 74 is provided a notch 74A, and this notch 74A has a predetermined dimension to be cut out in the circumferential direction of the rotating shaft 6 of the rotator 5 and simultaneously a predetermined depth to be cut out in the axial direction of the rotating shaft 6. In this case, when the length of the contact between the rotator core 74 and the internal wall of the shell 1A is H (H1+H2 in the drawing), and the laminated thickness of the stator core 74 (in this case, the dimension of the rotator 5 in the direction of the rotating shaft 6) is Ho, a ratio of the dimension H to the dimension Ho is configured to be $0.2 \leq H/Ho \leq 0.8$.

Namely, both sides H1 and H2 of the notch 74A provided in the stator core 74 in the circumferential direction of the rotating shaft 6 is caused to contact the internal wall of the shell 1A, and simultaneously the notch 74A is caused to be spaced from the internal wall of the shell 1A. Thereby, in the motor 2 (DC motor), the shake of the yoke of the above rotator 5 is difficult to transfer to the shell 1A due to a radial magnetic attraction/repulsion force of the rotator 5, as compared to a normal induction motor. Accordingly, the noise of the motor compressor C is possible to reduce.

On the other hand, the rotating compression element 3 comprises a first cylinder for a rotary 9 and a second cylinder for a rotary 10 separated by an intermediate parting stop 8. To each of the cylinders 9 and 10 is attached eccentrics 11 and 12 that are rotatably driven by the rotating shaft 6, and each eccentric of the eccentrics 11 and 12 are 180 degree out of phase from the other.

13 and 14, which are a first roller and a second roller, rotate within the cylinders 9 and 10 respectively, and each thereof rotates within the cylinders 9 and 10 by the rotation of the eccentrics 11 and 12, respectively. 15 and 16 are a first frame and a second frame respectively, the first frame 15 causes compressed air to be formed between the parting stop 8 and it upon the cylinder 9 being closed, and the second frame 16 also causes compressed air to be formed between the parting stop 8 upon the cylinder 10 being closed. Moreover, the first frame 15 and the second frame 16 comprise bearings 17 and 18 respectively that rotatably and axially support the lower portion of the rotating shaft 6.

19 and 20 are cap mufflers, which are attached so as to cover the first frame 15 and the second frame 16 respectively. In addition, the cylinder 9 and the cap muffler 19 are in communication by a communicating hole (not shown) provided in the first frame 15, and the cylinder 10 and the cap muffler 20 are also in communication by a communicating hole (not shown) provided in the second frame 16. Furthermore, in the present example, the cup muffler 20 facing the bottom surface of the closed vessel is in communication with the cup muffler 19 facing the top surface thereof via a penetrated hole 79 that penetrates the cylinders 9 and 10 and the intermediate parting stop 8.

22 is a vent pipe provided on the top of the closed vessel 1, and 23 and 24, which are suction pipes, connect to the cylinders 9 and 10 respectively. Moreover, 25, which is a closed terminal, is for supplying a power from the external side of the closed vessel 1 to a stator winding 7 of the stator 4 (a lead wire that connects the closed terminal 25 and the stator winding 7 is not shown).

In such a configuration, when power is applied to the stator winding 7 of the stator 4 of the motor 2, a rotating magnetic field is formed to rotate the rotator 5. The rollers 13 and 14 within the cylinders 9 and 10 are eccentrically rotated via the rotating shaft 6 due to this rotation of the rotator 5, and suction gas sucked from the suction pipes 23 and 24 is compressed.

The compressed high-pressure gas is vented into the cap muffler 19 from the cylinder 9 via the continuous hole, and is vented into the upper side of the closed vessel 1 from the vent hole (not shown) formed in this cup muffler 19. On the other hand, from the cylinder 10, the compressed high-pressure gas is vented into the cup muffler 20 via the communication hole, enters the cup muffler 19 through a penetrated hole (not shown), and is vented similarly into the upper side of the closed vessel 1 from the vent hole.

The vented high-pressure gas passes through a gap provided within the stator 4 of the motor 2, a gap between the stator core 74 and the rotor 5, and the concavities 32, 33, 34 and 35 of the rotor core 26 to go up. Furthermore, the gas impinges upon a plate 72 and, by a centrifugal force, is directed toward the outside to go up, and is vented from a vent pipe 22.

Figure 23:
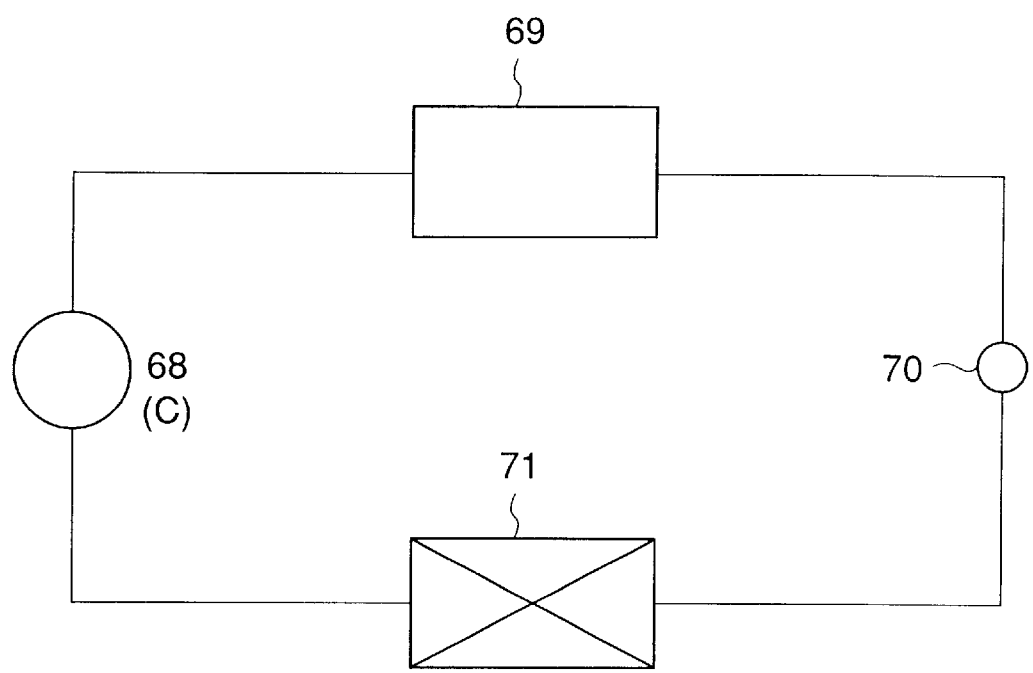
FIG. 23 is a refrigerant circuit diagram of a cooling apparatus using a motor compressor of the present invention.

Next, in FIG. 23 is shown a refrigerant circuit of a cooling apparatus using such a motor compressor C. The exit side of the motor compressor C is connected to a condenser 69, and the exit side of the condenser 69 (not shown) is connected to an expansion valve 70 that serves as a de-compression apparatus via a fluid receptor and a fluid pipe solenoid-operated valve. The expansion valve 70 is connected to an evaporator 71, and at the exit side of the evaporator 71 is configured an annular refrigerant circuit connected to the suction side of the motor compressor C via an accumulator. High-temperature and high-pressure gas refrigerant vented from the motor compressor C radiates heat, is condensed and liquefied at the condenser 69. Moreover, after the above gas is decompressed at the expansion valve 70, it enters the evaporator 71, wherein a cycle process for taking heat to gasify is to be repeated.

Figure 9:
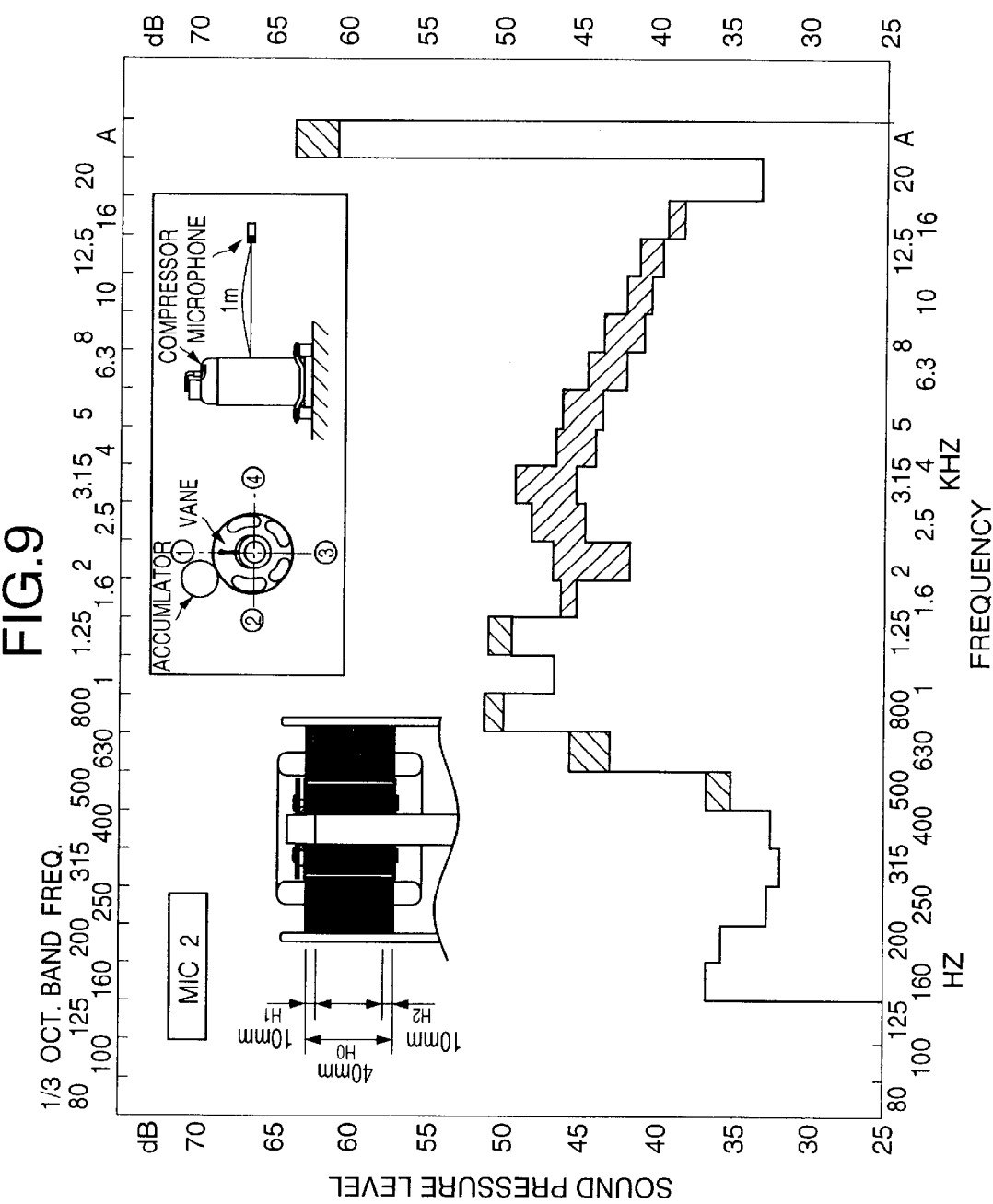
FIG. 9 is a diagram illustrating a waveform of noise of a motor compressor of the present invention with notches provided in a rotator in the circumferential direction of a rotating shaft.

A noise waveform of the above motor compressor (2 is shown in FIG. 9. It is seen from FIG. 9 that the noise within, the audible sound band (500 Hz to 1.6 kHz), which is hatched, decreased. In addition, the motor compressor C uses a two (2) cylinder rotary compressor (Twin rotary) 700 w, refrigerant is a R401A, the motor 2 is a series motor, and a rare earth permanent magnet is used. Moreover, it operated at (Ct/Et=43° C./44° C. and 80 Hz. A microphone is spaced 1 m from the motor compressor 2 in a horizontal position. This result is shown in table 1.

TABLE 1

| H/Ho | 1.0 | 0.75 | 0.5 | 0.375 | 0.25 |
|---|---|---|---|---|---|
| Ho | 40 | 40 | 40 | 40 | 40 |
| H | 40 | 30 | 20 | 15 | 10 |
| SOUND PRESSRE LEVEL db (A) | 63.5 | 62.5 | 61 | 60.5 | 60 |

It is seen from the above-mentioned table that the noise has been reduced.

Thus, the notch 74A is provided in the periphery surface of the stator core 74 that constructs the rotor 5 of the motor 2 (DC motor) used in the motor compressor C, the stator core surface other than this notch 74A is caused to contact the internal wall of the shell 1A, and therefore, in the motor 2 (DC motor) used in the motor compressor C, the yoke of the above rotor 5 is shaken due to a radial magnetic attraction/repulsion force of the rotator 5 as compared with a normal induction motor, but since the notch 74A is provided in the periphery surface of the stator core 74 that constructs the rotor 5 of the motor 2 used in the motor compressor to cause the surface other than the notch 74A to contact the internal wall of the shell 1A, even tough the yoke of the stator 4 is shaken, the vibration transfer to the shell 1A becomes possible to reduce. Accordingly, the noise of the motor compressor C can be drastically reduced.

In particular, in a rare earth permanent magnet motor with a high magnetic force and a magnetic-pole concentrated winding motor with less number of slots, even though a variation in magnetic flux is bigger as compared with a motor with much number of slots, since the notch 74A is provided in the periphery surface of the stator core 74 to cause the other than the notch to contact the internal wall of the shell 1A, a vibration transfer to shell 1A from the yoke of the stator 4 becomes possible to reduce. Similarly, this allows the noise of the motor compressor C to be drastically reduced.

Figure 10:
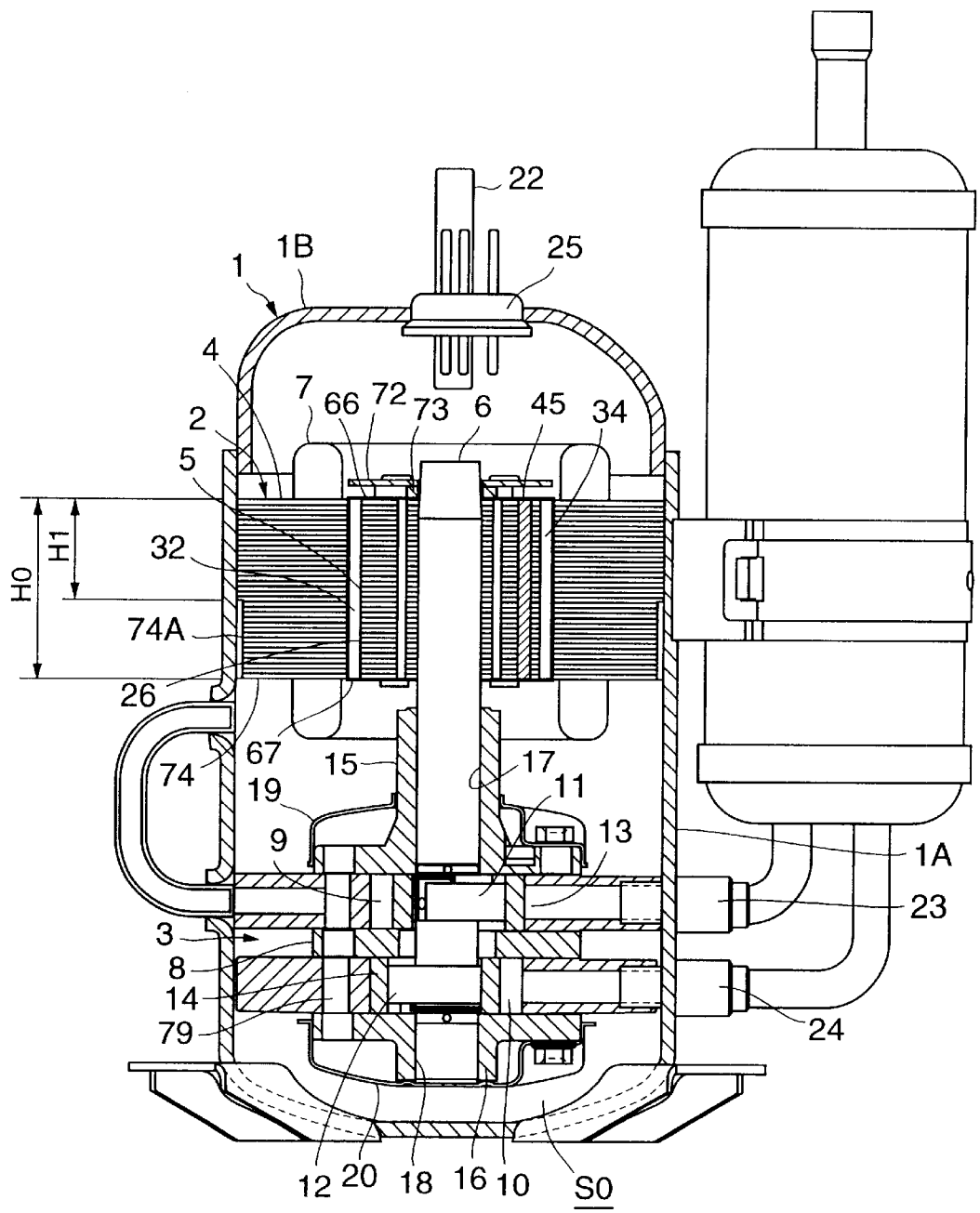
FIG. 10 is a longitudinally sectional side view of a second embodiment of the motor compressor.
Figure 11:
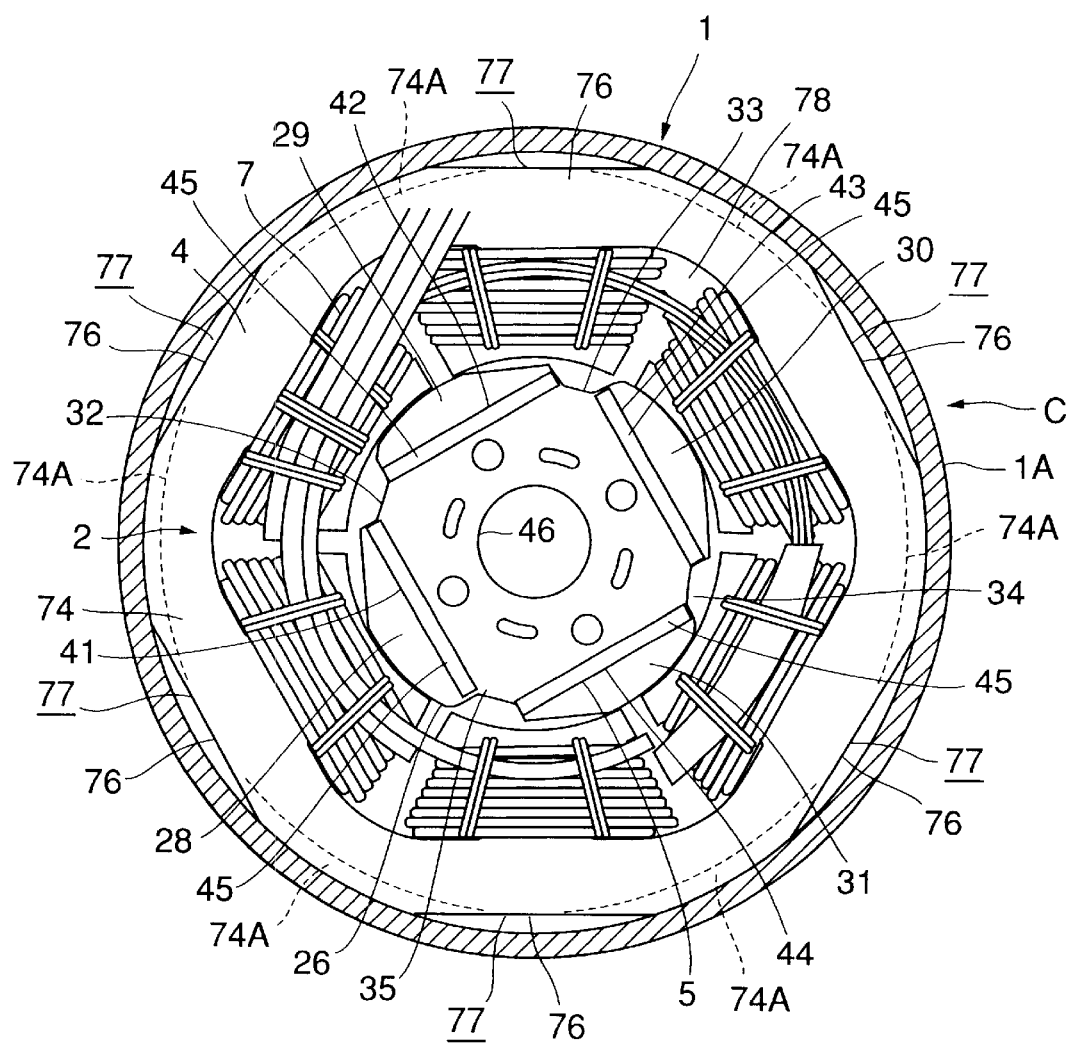
FIG. 11 is a cross sectional top view of a motor compressor of FIG. 10.

Next, in FIG. 10 and FIG. 11 is shown one more motor compressor C. In this case, in the periphery surface of the stator core 74 is provided the notch 74A with a predetermined dimension cut out in the circumferential direction of the rotating shaft 6 of the rotor 5, and simultaneously with a predetermined depth cut out in the direction of the rotating shaft 6. The above notch 74A has a predetermined dimension to be cut out in the circumferential direction of the rotating shaft 6 from anyone of the upper side and the lower side of the periphery surface of the stator core 74, viewed from the center of the stator core 74 (the lower side in the drawings) and simultaneously a predetermined depth to be cut out in the direction of the rotating shaft 6. In this case, when the length of the contact of the stator core 74 and the internal wall of the shell 1A is H (H1 in the drawings), and the laminated thickness of the stator core 74 (in this case, the dimension of the rotator 5 in the direction of the rotating shaft 6) is Ho, $0.2 \leq H/Ho \leq 0.8$ is to be set.

Namely, one part of the side of the notch 74A provided in the circumferential direction of the rotating shaft 6 of the stator core 74 is caused to contact the internal wall of the shell 1A, and simultaneously the notch 74A is caused to be spaced from the internal wall of the shell 1A. In addition, FIG. 10 and FIG. 11 are similar to FIG. 1 and FIG. 2 except the stator core 74. Thereby, in the motor 2 (DC motor) as compared with a normal induction motor, the shake of the yoke of the above rotator 5 is difficult to transfer to the shell 1A due to a radial magnetic attraction/repulsion force of the rotator 5. Accordingly, it becomes possible to similarly reduce the noise of the motor compressor C as set forth above.

Figure 12:
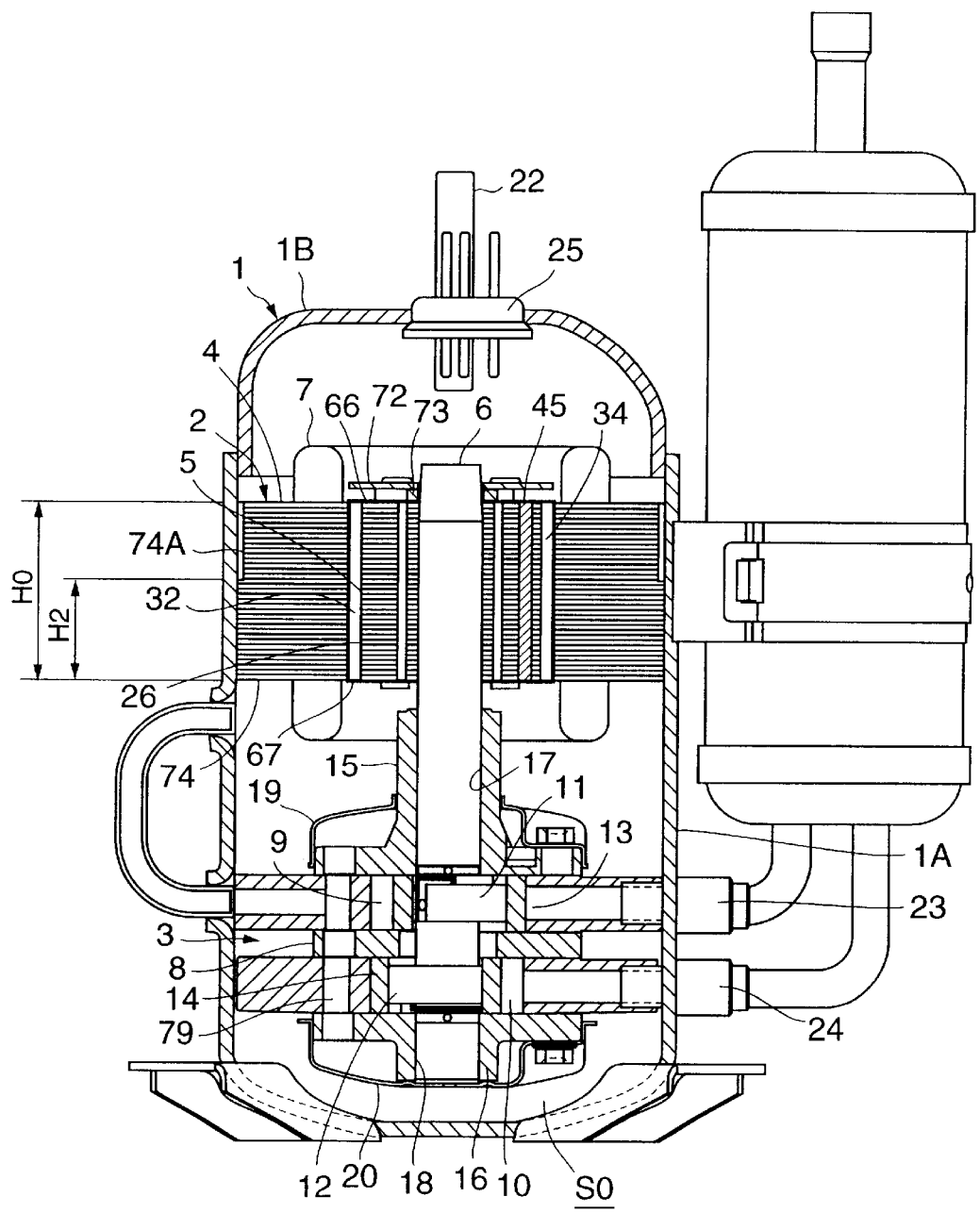
FIG. 12 is a longitudinally sectional side view of a third embodiment of the motor compressor.
Figure 13:
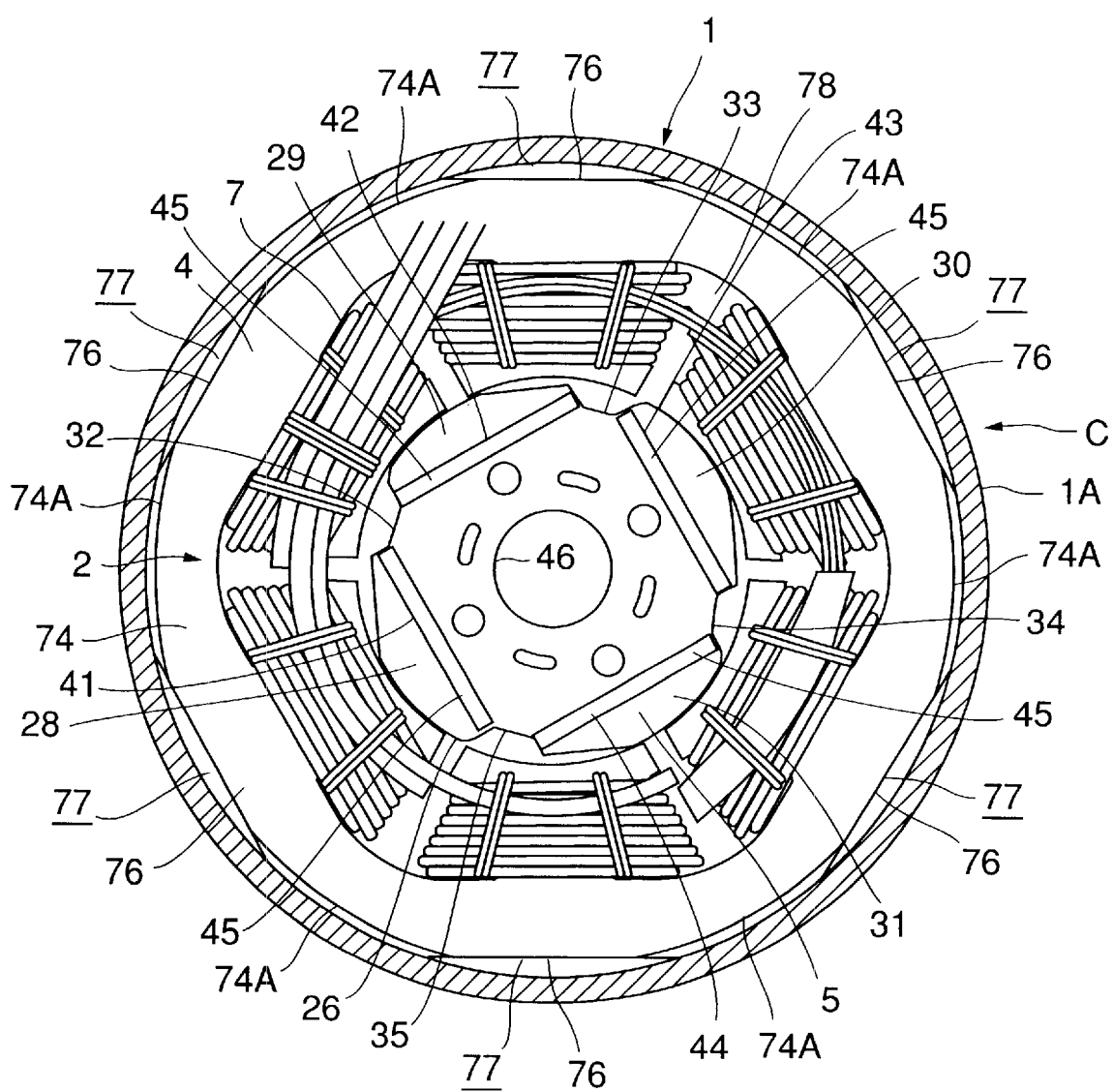
FIG. 13 is a cross sectional top view of a motor compressor of FIG. 12.

Next, in FIG. 12 and FIG. 13 is shown one more motor compressor C. In this case, in the periphery surface of the stator core 74 is provided the notch 74A with a predetermined dimension cut out in the circumferential direction of the rotating shaft 6 of the rotor 5, and simultaneously with a predetermined depth cut out in the direction of the rotating shaft 6. The above notch 74A has a predetermined dimension to be cut out in the circumferential direction of the rotating shaft 6 from anyone of the upper side and the lower side of the periphery surface of the stator core 74, viewed from the center of the stator core 74 (the upper side in the drawings), and simultaneously a predetermined depth to be cut out in the direction of the rotating shaft 6. In this case, when the length of the contact of the stator core 74 and the internal wall of the shell 1A is H (H2 in the drawings), and the laminated thickness of the stator core 74 (in this case, the dimension of the rotator 5 in the direction of the rotating shaft 6) is Ho, $0.2 \leq H/Ho \leq 0.8$ is to be set.

Namely, one part of the side H2 of the notch 74A provided in the suitor core 74 in the circumferential direction of the rotating shaft 6 is caused to contact the internal wall of the shell 1A, and simultaneously the notch 74A is caused to be spaced from the internal wall of the shell 1A. In addition, FIG. 12 and FIG. 13 are similar to FIG. 1 and FIG. 2 except the suitor core 74. Thereby, in the motor 2 (DC motor), as compared with a normal induction motor, the shake of the yoke of the above rotator 5 is difficult to transfer to the shell 1A due a radial magnetic attraction/repulsion force of the rotator 5, thus similarly enabling the reduction in the noise the motor compressor C as set forth above.

Figure 14:
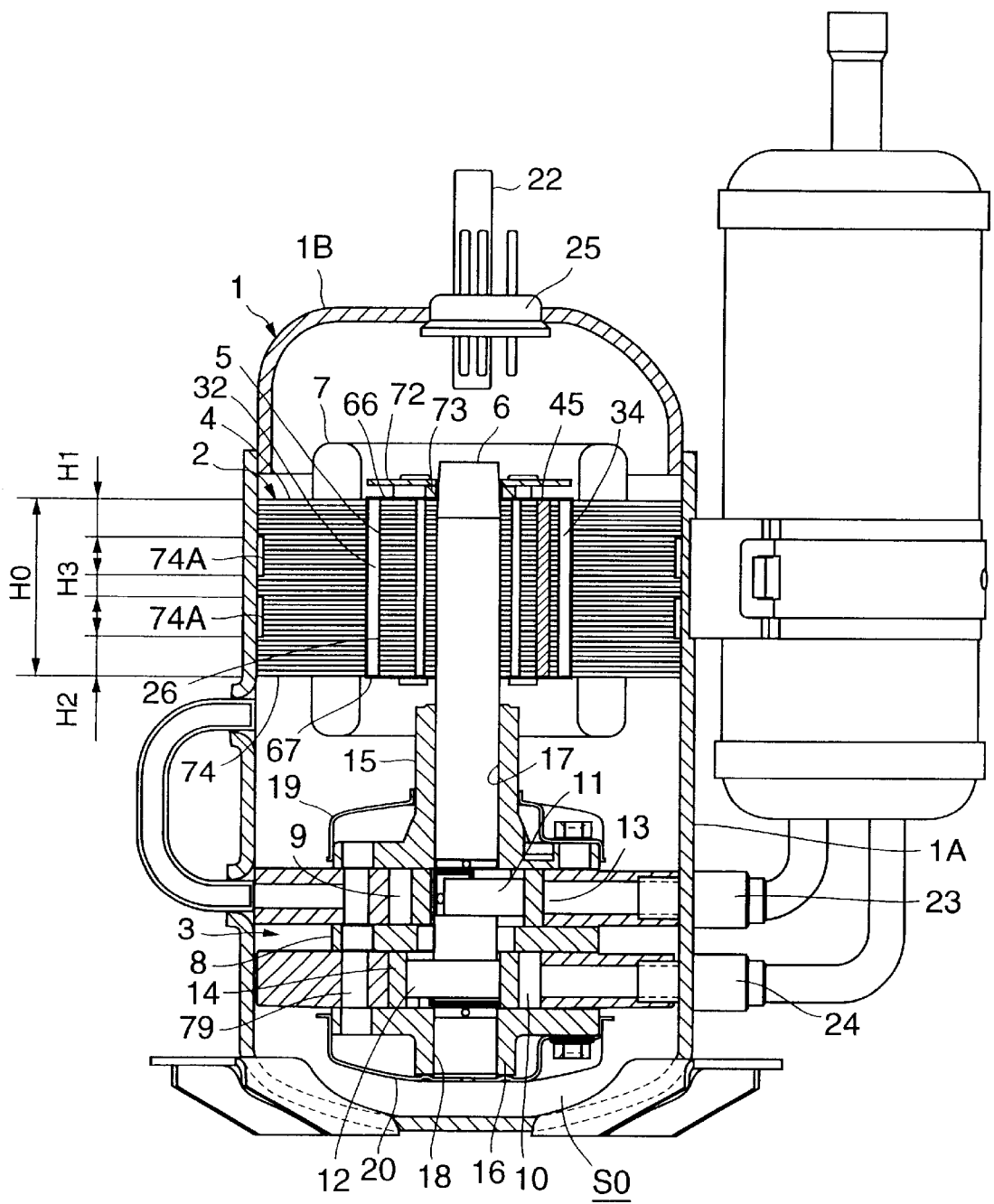
FIG. 14 is a longitudinally sectional side view of a fourth embodiment of the motor compressor.
Figure 15:
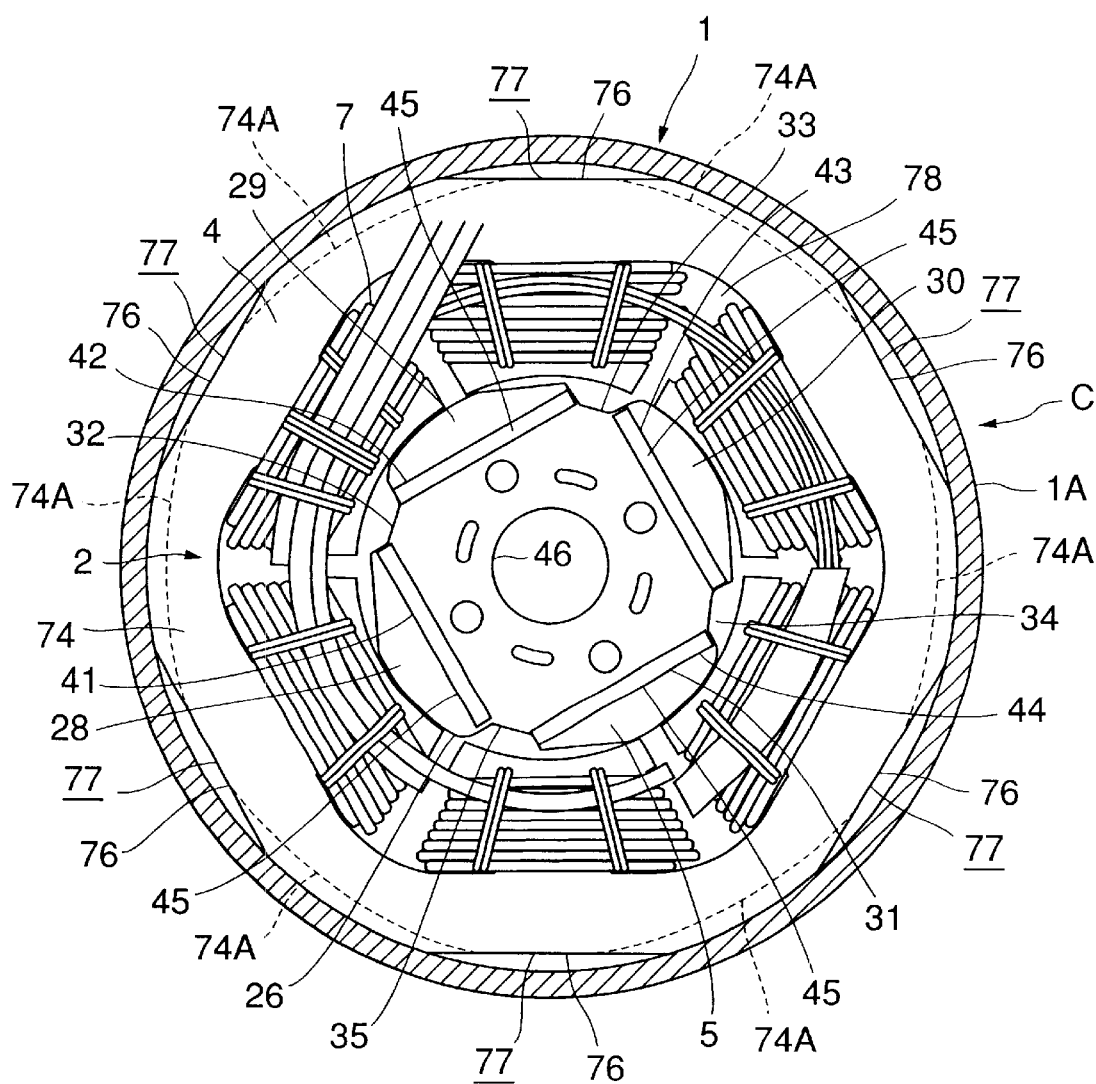
FIG. 15 is a cross sectional top view of a motor compressor of FIG. 14.

Next, in FIG. 14 and FIG. 15 is shown one more motor compressor C. In this case, in the periphery surface of the stator core 74 is provided the notch 74A with a predetermined dimension cut out in the circumferential direction of the rotating shaft 6 of the rotator 5, and simultaneously with a predetermined depth cut out in the direction of the rotating shaft 6. In the above notch 74A, are cut out several areas in the circumferential direction, and simultaneously a predetermined depth is cut out in the direction of the rotating shaft 6. In this case, when the length of the contact of the stator core 74 and the internal wall of the shell 1A is H (H1+H2+H3 in the drawings), the laminated thickness of the stator core 74 (in this case, the dimension in the direction of the rotating shaft 6 of the rotator 5) is Ho, $0.2 \leq H/Ho$ (H1+H2+H3)$\leq 0.8$ is to be set.

Namely, the other areas (H1+H2+H3 in the drawings) than the notches 74A provided at two (2) locations in the circumferential direction of the rotating shaft 6 of the stator core 74 is caused to contact the internal wall of the shell 1A, and simultaneously the notch 74A is caused to be spaced from the internal wall of the shell 1A. In addition, FIG. 14 and FIG. 15 are similar to FIG. 1 and FIG. 2 except the stator core 74. Thereby, in the motor 2 (DC motor) as compared with a normal induction motor, the shake of the yoke of the above rotator 5 is difficult to transfer to the shell 1A due to a radial magnetic attraction/repulsion force of the rotator 5, similarly enabling the reduction in the noise of the motor compressor C as set forth above.

Figure 16:
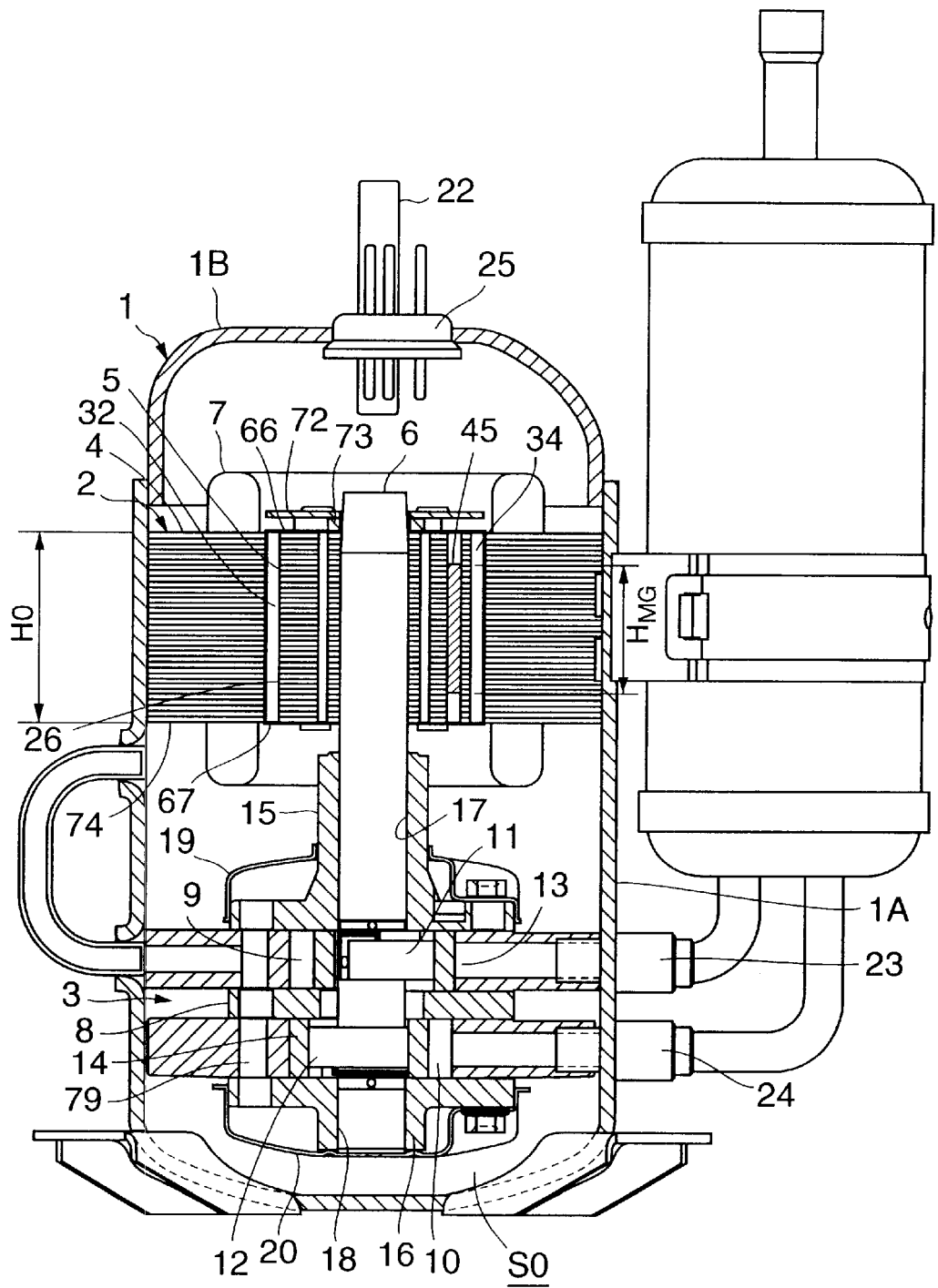
FIG. 16 is a Longitudinally sectional side view of a fifth embodiment of the motor compressor of the present invention configures so that a magnetic substance provided in a rotor is shorter than a stator.
Figure 17:
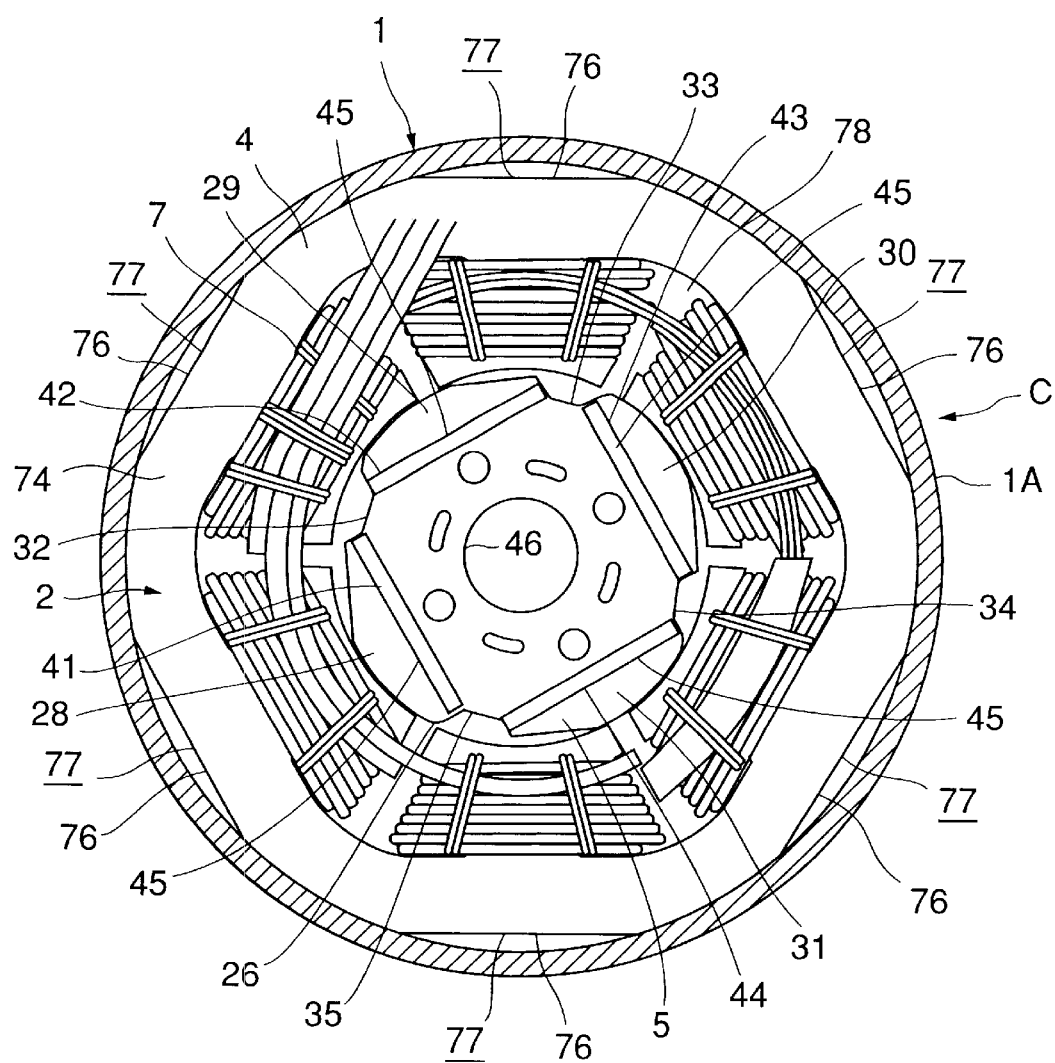
FIG. 17 is a cross sectional top view of a motor compressor of FIG. 16.

Next, in FIG. 16 and FIG. 17 is shown one more motor compressor C. In this case, the laminated thickness of each of the magnetic substances 45(permanent magnet) 4 inserted into each of the slots 41, 42, 43 and 44 provided in the rotator 5 is caused to be set to be smaller than the laminated thickness of the stator core 74 (in this case, the dimension in the direction of the rotating shaft 6 of the rotator 5). Furthermore, each of the magnetic substances 45(permanent magnet) inserted into each of the slots 41, 42, 43 and 44 is caused to be positioned at the center of the longitudinal direction of each of the slots 41, 42, 43 and 44. Moreover, in case that the laminated thickness of the magnetic substances 45 provided in the rotator 5 is Hmg, and that the laminated thickness of the suitor core 74 is Ho, a ratio of the dimension Hmg to the dimension Ho is configured to be $0.2 \leq Hmg/Ho \leq 0.98$. Namely, each of the magnetic substances 45 inserted into each of the slots 41, 42, 43 and 44 is to be shortened by the same dimension from each of both ends of the slots 41,42,43 and 44. In addition, FIG. 16 and FIG. 17 are similar to FIG. 1 and FIG. 2 except the magnetic substance 45. Thereby, in the motor 2 as compared with a normal induction motor, the shake of the yoke of the above rotator 5 is difficult to transfer to the shell 1A due to a radial magnetic attraction/repulsion force of the rotator 5, thus similarly enabling the reduction in the noise of the motor compressor C as set forth above.

Figure 8:
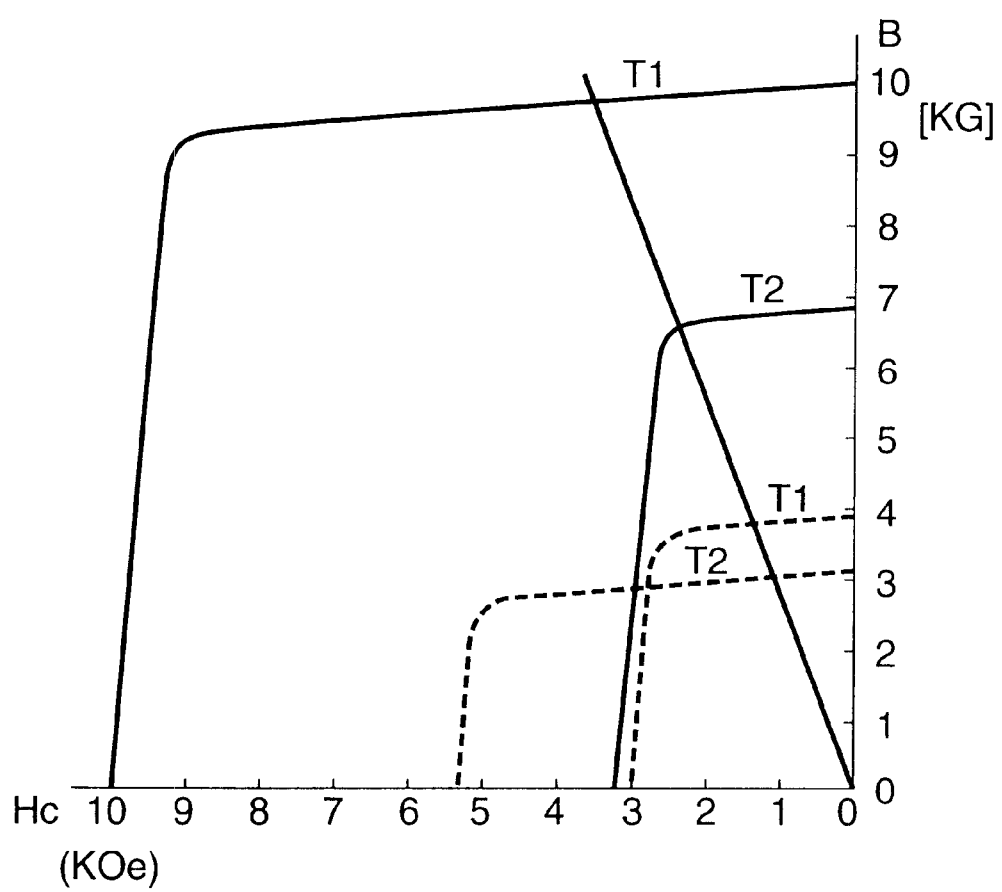
FIG. 8 is a diagram illustrating a demagnetization curve of a permanent magnet that is used as a magnetic substance.

FIG. 8 is a diagram illustrating a demagnetization curve of a ferrite magnet material and of a rare earth-based magnet material that are a permanent magnet that is used as a magnetic substance 45, in which the longitudinal axis indicates a magnetic flux density B and a lateral axis a coercive force Hc. In addition, in the same drawing in case of a general ferrite magnet material the curve is shown by a broken line, in case of a rare earth-based magnet material by a solid line, and the curve at +25° C. is T1 and the curve at +150° C. is T2 respectively. As apparent from FIG. 8, both of the residual magnetic flux density Br and the coercive force Hc of the rare earth-based magnet material are big as compared with that of the ferrite magnet material, and a magnetic energy product is also very big. Accordingly, even though a magnet area is lessened, a necessary gap magnetic flux number can be maintained, thus being able to obtain a required output.

Namely, even though the laminated thickness of each of the magnetic substances 45 is made shorter than the laminated thickness of the stator core 74, a required output is possible to obtain, and therefore, the shake force being applied to the teeth of the stator 4 is possible to distribute towards the direction [(an arrow direction in the drawing)] of a wider width (Ho) of the rotator 4 rather than a width (Hmg)of the magnetic substance 45 almost without the reduction in the output of the motor 2, thus being able to alleviate the vibration transfer to the shell 1A by a distribution of the vibration transfer. In addition, it has been determined from effectiveness of the motor 1 and the cost of the stator 4 that the minimum Hmg/Ho is set to be 0.2.

Figure 18:
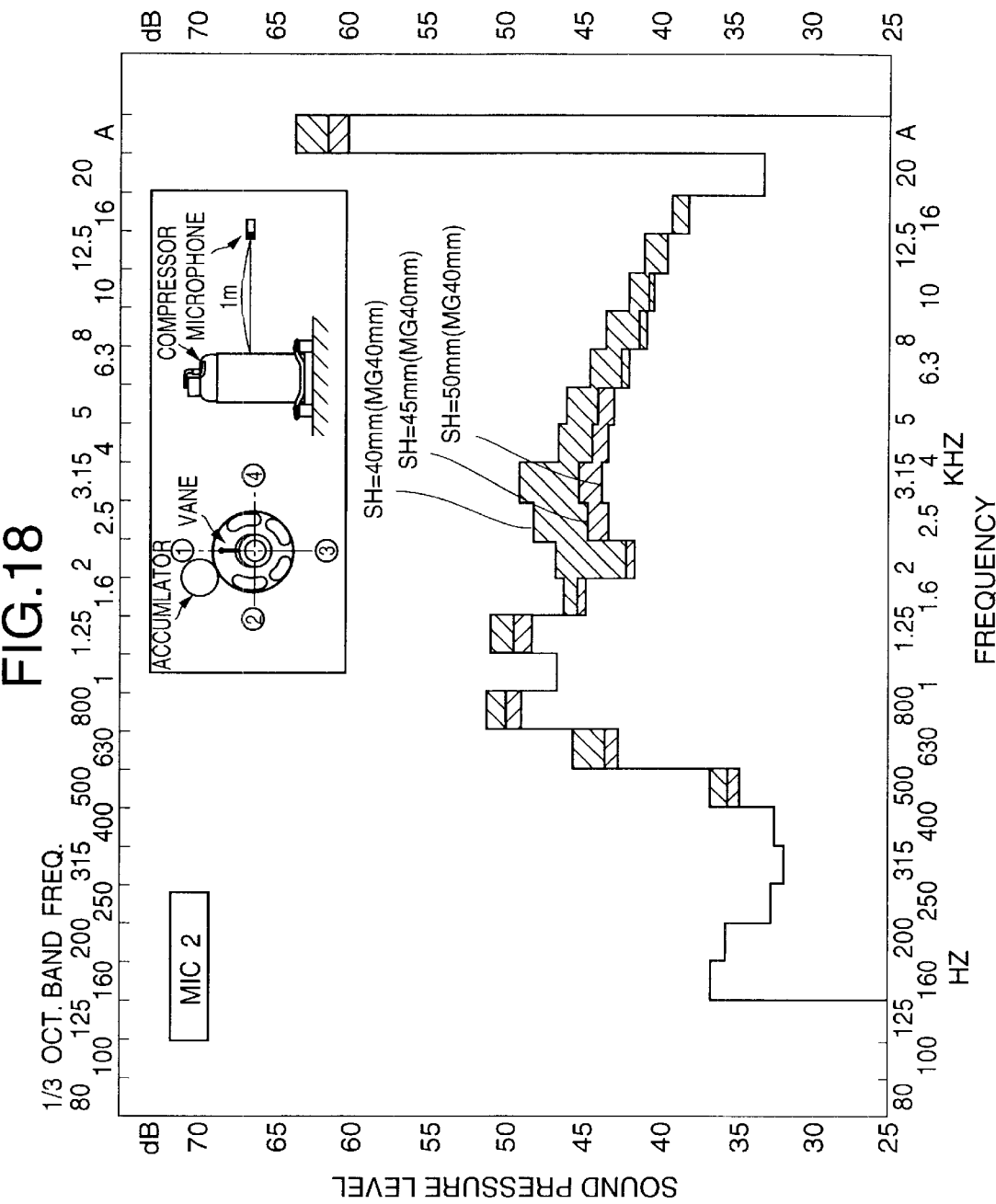
FIG. 18 is a diagram illustrating a waveform of noise of a motor compressor configured so that a magnetic substance provided in a rotor is shorter than a stator.

The waveform of the noise of this motor compressor C is shown in FIG. 18. The noise is reduced in the band hatched in the drawing, 00 Hz to 10 Hz (the audible sound band). In this drawing. SH indicates Ho. It is seen from this drawing that in case of the stator 4 width Ho=40 mm and the magnetic substance 45 width Hmg=40 mm, the noise is conventionally big, in case of the stator 4 width Ho=50 mm and the magnetic substance 45 width Hmg=40 mm, the noise has been reduced, and in case of the stator 4 width Ho=45 mm and the magnetic substance 45 width Hmg=40 mm, the noise is between that of the stator 4 width Ho=40 mm and that of Ho=50. In addition, also in this case, the motor compressor C uses a twin rotary 700 W, the refrigerant is a R401A, the motor 2 is a series motor, and a rare earth permanent magnet is used. Moreover, It operated at Ct/Et= 43° C./44° C. and 80 Hz. A microphone is spaced 1 m from the motor compressor 2 in a horizontal position. In addition, an explanation of FIG. 18 is shown in table 2, and the noise level is a value when Hmg/H varies.

TABLE 2

| H/Ho | 1.0 | 0.89 | 0.8 | 0.6 | 0.4 |
|---|---|---|---|---|---|
| Ho | 40 | 45 | 50 | 50 | 50 |
| H | 40 | 40 | 40 | 30 | 20 |
| SOUND PRESSRE LEVEL db (A) | 63.5 | 61.5 | 60.5 | 60 | 59.5 |

It is seen from the above-mentioned table that the noise has been reduced.

Figure 19:
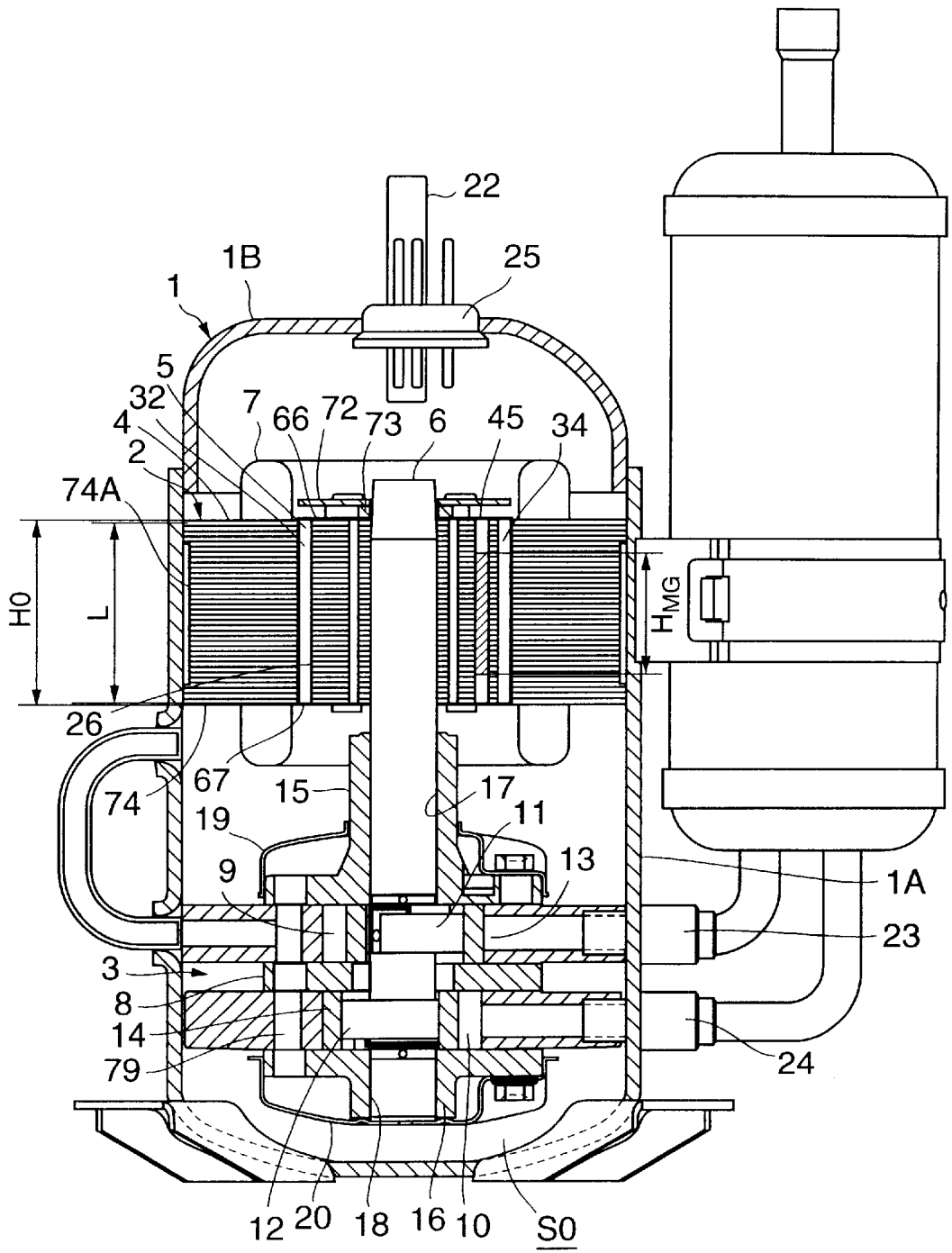
FIG. 19 is a longitudinally sectional side view of a sixth embodiment of the motor compressor of the present invention configures so that notches are provided in a rotator in the circumferential direction of a rotating shaft and simultaneously a dimension of a magnetic substance provided in a rotor is shorter than that of a stator.
Figure 20:
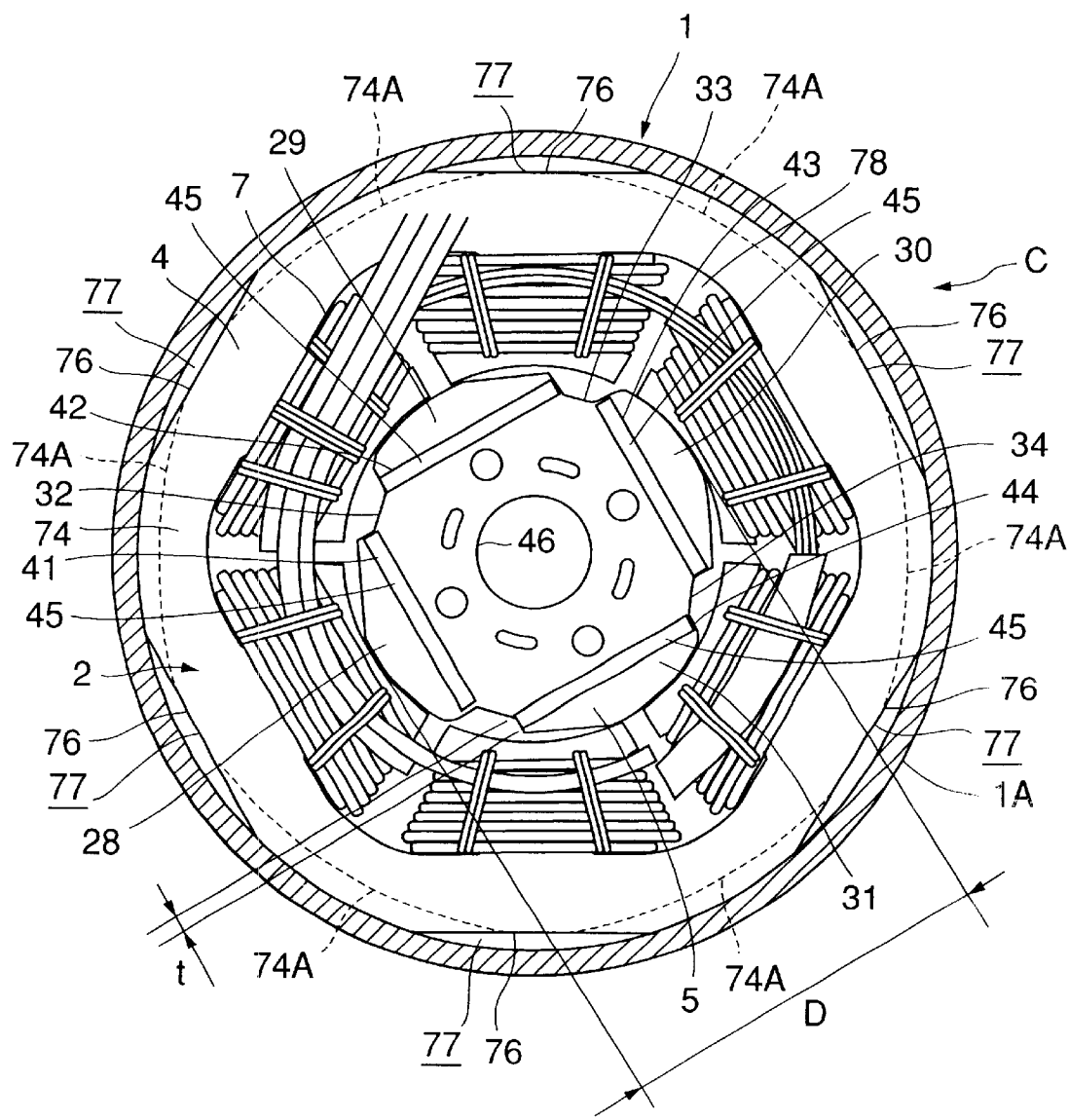
FIG. 20 is a cross sectional top view of a motor compressor of FIG. 19.
Figure 21:
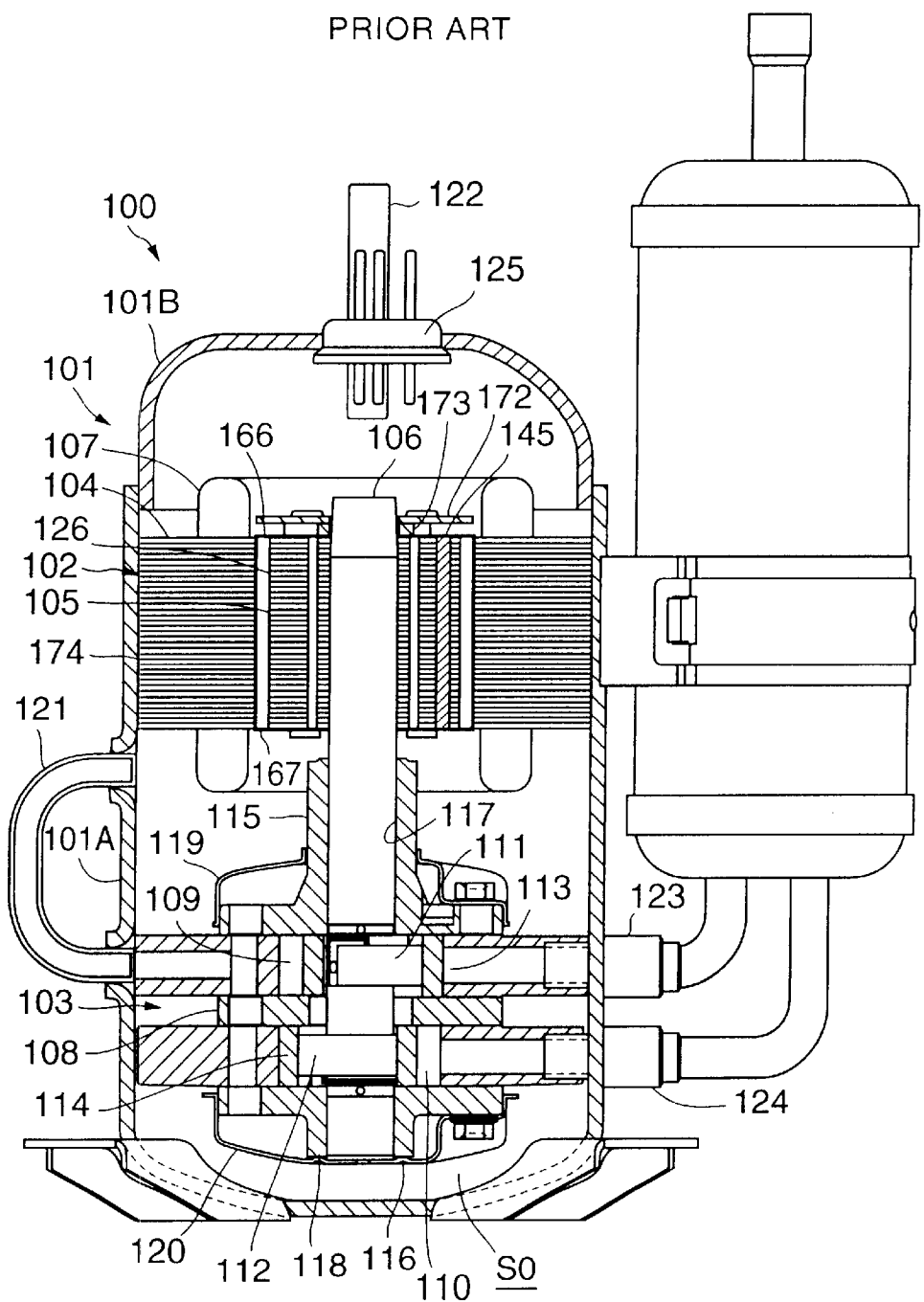
FIG. 21 is a cross sectional side view of a conventional motor compressor.
Figure 22:
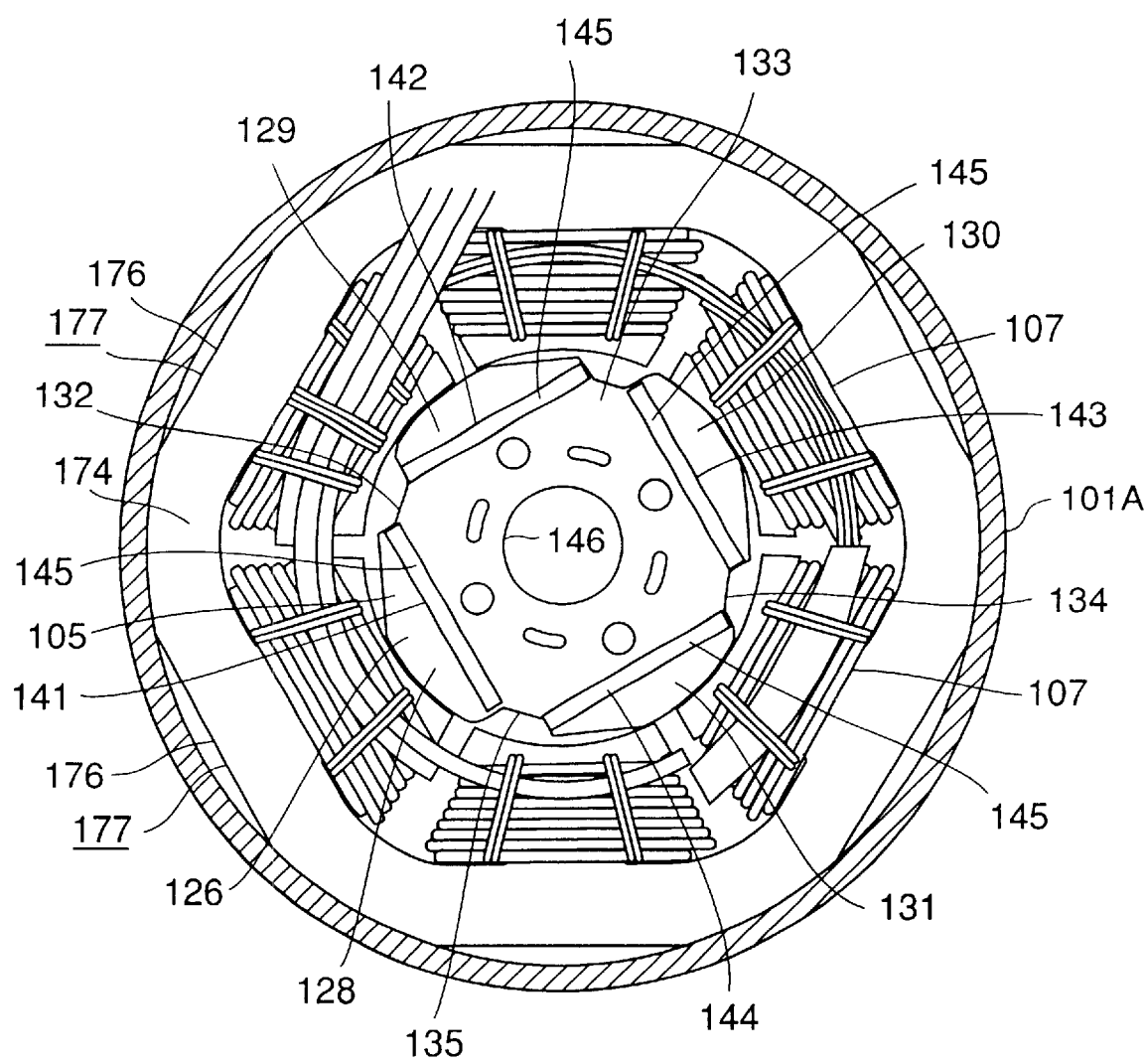
FIG. 22 is a cross sectional top view of a motor compressor of FIG. 21.

Next, one more motor compressor C is shown in FIG. 19 and FIG. 20. In this case, in the motor compressor C, the stator 4 with the notch 74A of FIG. 1 provided is used, and simultaneously the rotator 5 is provided in which the laminated thickness of each of the magnetic substances 45 [...] inserted into each of the slots 41, 42, 43 and 44 of FIG. 16 is shorter than that of the stator core 74.

The above magnetic substance 45 is configured so that a ratio of the diameter D and the dimension L in the direction of the rotating shaft 6 of the rotator core 26, L/D, is set to be smaller than 1.1, and simultaneously a ratio of the thickness t and the laminated thickness Hmg in the direction of the rotating shaft of the magnetic substance 45, t/Hmg, is set to be smaller than 0.1. Namely, it allows the vibration of the yoke of the rotator 4 to be distributed to reduce the vibration of the shell 1A that the magnetic substance 45 is constituted of the rare earth-based magnet material, and that, simultaneously, in case that the diameter of the rotator core 26 of the rotator 5 is D, the dimension of the above rotator core 26 in the direction of the rotating shaft 6 is L, and the thickness of the magnetic substance 45 is t, a ratio of the dimension L to the dimension D is set at L/D<1.1 and a ratio of the dimension t to the dimension Hmg is set at t/Hmg<0.1, and simultaneously, it allows the vibration of the yoke of the stator 4 to be furthermore distributed to reduce the vibration of the shell that a ratio of the thickness dimension t and the laminated thickness Hmg in the direction of the rotating shaft 6 of the magnetic substance 45, t/Hmg, is set to be smaller than 0.1. In addition, FIG. 19 and FIG. 20 are similar to FIG. 1 and FIG. 2 except the stator core 74 and the magnetic substance 45. Even though the yoke of the stator 4 is shaken, this allows the shake force being applied to the teeth of the stator 4 to be distributed to drastically reduce the vibration transfer to the shell 1A. Accordingly, it becomes possible to drastically reduce the noise that is generated by the cooling apparatus provided in a air-conditioner, a cooling warehouse, a refrigerator, a showcase, and the like.

In accordance with the present invention set for in details above, the motor element is constituted of the stator having the stator core that contacts and is fixed to the internal wall of the container, and the rotator having the magnetic substance, which is attached to the rotating shaft and rotatably supported in the inside of the stator, and simultaneously, in case that the dimension of the area in which the stator core contacts the closed vessel is H, the dimension of the above stator core in the direction of the rotating shaft is Ho, is configured to be H<Ho, and therefore, the transfer of the vibration to the shell from the stator core can be lessened. Even though the yoke of the stator 4 is shaken, this enables the reduction of the vibration transfer to the teeth. Accordingly, it becomes possible to drastically reduce the noise of the motor compressor.

Furthermore, in accordance with the present invention, the motor element is constituted of the stator having the stator core that contacts and is fixed to the internal wall of the container, and the rotator having the magnetic substance, which is attached to the rotating shaft and rotatably supported in the inside of the stator, and simultaneously, in case that the dimension of the magnetic substance in the direction of the rotating shaft is Hmg, the dimension of the above stator core in the direction of the rotating shaft is Ho, is configured to be Hmg<Ho, and therefore, a magnetic force of the magnetic substance in the direction of the rotating shaft of the stator core is possible to distribute. This allows the vibration of the rotator due to the magnetic force to be mainly concentrated toward the direction of the rotating shaft, thus reducing the vibration being applied to the shell. Accordingly, it becomes possible to drastically reduce the noise of the motor compressor.

Furthermore, in accordance with the present invention, the motor element is constituted of the stator having the stator core that contacts and is fixed to the internal wall of the container, and the rotator having the magnetic substance, which is attached to the rotating shaft and rotatably supported in the inside of the stator, and simultaneously, in case that the dimension of the area in which the stator core contacts the closed vessel is H, the dimension of the above stator core in the direction of the rotating shaft is Ho, and the dimension of the magnetic substance in the direction of the rotating shaft is Hmg, the motor element is configured to be H<Ho and Hmg<Ho, and therefore, the transfer of the vibration to the shell from the stator can be lessened, and yet, the magnetic force of the magnetic substance in the direction of the rotating shaft of the stator core is possible to distribute. Accordingly, it becomes possible to drastically reduce the noise of the motor compressor.

Furthermore, in accordance with the present invention, in addition to the first or the third invention, since a ratio of the dimension H to the dimension Ho is set to be $0.2 \leq H/Ho \leq 0.8$, as compared with a normal induction motor, the shake of the yoke of the rotator due to the a radial magnetic attraction/repulsion force of the rotator is difficult to transfer to the shell. Accordingly, it becomes possible to drastically reduce the noise of the motor compressor.

Furthermore, in accordance with the present invention, in addition to the second or the third invention, since a ratio of the dimension Hmg to the dimension Ho is set to be $0.2 \leq Hmg/Ho \leq 0.98$, and therefore, the shake force being applied to the teeth of the stator is possible to distribute. This allows the transfer of the vibration to the shell to decrease. Accordingly, while preventing the decrease in effectiveness of the motor and a cost-up of the stator, the vibration of the yoke of the stator that is shaken can be distributed, thus drastically reducing the noise of the motor compressor.

Furthermore, in accordance with the present invention, in addition to these, the magnetic substance is constituted of the rare earth-based magnet material, and simultaneously in case that the diameter of the rotator core of the rotator is D, the dimension of the above rotator core in the direction of the rotating shaft is L, and the thickness of the magnetic substance is t, a ratio of the dimension L to the dimension D is set to be L/D<1.1, and a ratio of the dimension t to the dimension Hmg is set to be t/Hmg<0.1, and therefore, it allows the dimension of the rotator core to be reduced while keeping a required motor output and simultaneously allows the vibration being generated by deflection of the rotator to be distributed to reduce the vibration of the shell that a ratio of the diameter D and the dimension L in the direction of the rotating shaft of the rotator core, L/D, is set to be smaller than 0.1, as compared with the case in which such ferrite magnet material as used conventionally is employed. Moreover, it allows the vibration being generated by deflection of the rotator to be furthermore distributed to reduce the vibration of the shell that a ratio of the thickness t and the laminated thickness Hmg in the direction of the rotating shaft of the magnetic substance, t/Hmg, is set to be smaller than 0.1, thus enhancing an effect of a drastic reduction in the noise. This allows the noise of the motor compressor to be drastically reduced, while preventing the decrease in effectiveness of the motor and a cost-up of the stator. Accordingly, it becomes possible to drastically enhance a practical effect of the motor compressor.

In particular, since a ratio of the diameter D and the dimension L in the direction of the rotating shaft of the rotator core, L/D, is set to be smaller than 1.1 to exclusively apply the dimension reduction of the rotator core to the dimension L in the direction of the rotating shaft, the vibration being generated by deflection of the rotator can be reduced without any alteration to a production equipment and the like caused by any change in the diameter of the rotator core or in the outer diameter of the closed vessel of the compressor.

Yet furthermore, since a refrigerant circuit is constituted of the motor compressor of the present invention, and a condenser, a decompression apparatus and an evaporator, it becomes possible to drastically reduce the noise of a cooling apparatus provided in a air-conditioner, a cooling warehouse, a refrigerator, a showcase, and the like. Accordingly, it is to be realized that a preferred cooling apparatus for a noise environment can be provided.

What is claimed is:

1. A motor compressor comprising a motor element and a compression element which is driven by a rotating shaft connected to the motor element in a closed vessel, wherein
the motor element is constituted of a stator having a stator core that contacts, and is fixed to, an inside wall of the closed vessel, and a rotator having a magnetic substance, and the rotator is attached to a rotating shaft and rotatably supported in the inside of the stator; a peripheral area of one portion of said stator core contacts and is fixed to the inside wall of the closed vessel and another portion of said peripheral area is laterally spaced from, and out of contact with, the inside wall of the closed vessel, wherein H<Ho is satisfied when Ho is a dimension representing the total length of the core measured in a direction parallel to the axis of the rotating shaft, and H is a dimension codirectional with Ho and representing a portion of the core that contacts and is fixed to the inside wall of the closed vessel.

2. A motor compressor containing a motor element and a compression element which is driven by a rotating shaft connected to the motor element in a closed vessel, wherein
the motor element is constituted of a stator having a stator core that contacts, and is fixed to, an internal wall of the closed vessel, and a rotator having a magnetic substance, and the rotator is attached to the rotating shaft and rotatably supported in the inside of the stator; wherein Hmg<Ho is satisfied when Ho is a dimension representing the total length of the core measured in a direction parallel to the axis of the rotating shaft, and Hmg is a dimension codirectional with Ho and representing a length of the magnetic substance.

3. A motor compressor comprising a motor element and a compression element which is driven by a rotating shaft connected to the motor element in a closed vessel, wherein
the motor element is constituted of a stator having a stator core, a portion of the peripheral area of which contacts and is fixed to an internal wall of the closed vessel, and a rotator having a magnetic substance, and the rotator is attached to die rotating shaft and rotatably supported in the inside of the stator; wherein H<Ho and Hmg<H are satisfied when Ho is a dimension representing the total length of the core measured in a direction parallel to the axis of the rotating shaft, H is a dimension codirectional with Ho and representing the portion of the core that contacts and is fixed to the internal wall of the closed vessel, and Hmg is a dimension codirectional with Ho and representing the length of the magnetic substance.

4. The motor compressor according to claim 1 or 3, wherein a ratio of the dimension H to the dimension Ho is set to be 0.2≦H/Ho≦0.8.

5. The motor compressor according to claim 2 or 3, wherein a ratio of the dimension Hmg to the dimension Ho is set to be 0.2≦Hmg/Ho≦0.98.

6. The motor compressor according to claim 1, claim 2 or claim 3, wherein the magnetic substance is constituted of a rare earth-based magnet material; and a ratio of L to D, L/D<1.1 is satisfied wherein L is a dimension in a rotating shaft direction of the above rotor core and D is a diameter of the rotator core of the rotator, and a ratio oft to the dimension Hmg, t/Hmg<0.1 is satisfied wherein t is a thickness dimension of the magnetic substance.

7. A refrigerating apparatus in which a refrigerant circuit is constituted of the motor compressor according to claim 1, claim 2 or claim 3, a condenser, a decompression apparatus and an evaporator.

* * * * *